United States Patent
Pawloski et al.

(10) Patent No.: US 10,675,853 B2
(45) Date of Patent: Jun. 9, 2020

(54) HIGH-TEMPERATURE SOLUBLE SUPPORT MATERIAL FOR ADDITIVE MANUFACTURING

(71) Applicant: Stratasys, Inc., Eden Prairie, MN (US)

(72) Inventors: Adam R. Pawloski, Lake Elmo, MN (US); Jiayi Zhu, Woodbury, MN (US); Kent Kaske, Woodbury, MN (US); Luke M. B. Rodgers, Chaska, MN (US); Theresa Sherar, Prior Lake, MN (US)

(73) Assignee: STRATASYS, INC., Eden Prairie, MN (US)

( * ) Notice: Subject to any disclaimer, the term of this patent is extended or adjusted under 35 U.S.C. 154(b) by 638 days.

(21) Appl. No.: 15/311,719

(22) PCT Filed: May 13, 2015

(86) PCT No.: PCT/US2015/030603
§ 371 (c)(1),
(2) Date: Nov. 16, 2016

(87) PCT Pub. No.: WO2015/175682
PCT Pub. Date: Nov. 19, 2015

(65) Prior Publication Data
US 2017/0087774 A1 Mar. 30, 2017

Related U.S. Application Data

(60) Provisional application No. 61/994,345, filed on May 16, 2014.

(51) Int. Cl.
*B33Y 10/00* (2015.01)
*B33Y 70/00* (2020.01)
(Continued)

(52) U.S. Cl.
CPC ............ *B33Y 10/00* (2014.12); *B29C 64/106* (2017.08); *B29C 64/40* (2017.08); *B33Y 70/00* (2014.12);
(Continued)

(58) Field of Classification Search
CPC ....... B33Y 10/00; B33Y 70/00; C08F 212/08; C08F 220/06; B29C 64/00; B29C 64/10;
(Continued)

(56) References Cited

U.S. PATENT DOCUMENTS

| | | |
|---|---|---|
| 4,863,538 A | 9/1989 | Deckard |
| 5,121,329 A | 6/1992 | Crump |

(Continued)

FOREIGN PATENT DOCUMENTS

| | | |
|---|---|---|
| EP | 2109009 A1 | 10/2009 |
| JP | 2004218386 A | 8/2004 |

(Continued)

OTHER PUBLICATIONS

International Search Report and Written Opinion dated Jun. 7, 2015 for corresponding International Application No. PCT/US2015/030603, filed May 13, 2015.

(Continued)

*Primary Examiner* — Stella K Yi
(74) *Attorney, Agent, or Firm* — Westman, Champlin & Koehler, P.A.

(57) ABSTRACT

A support material for use in an additive manufacturing system, which includes a thermoplastic copolymer polymerized from monomers comprising acid-functional monomers having carboxylic acid groups, and one or more non-acid-functional monomers, where a portion of the carboxylic acid groups are neutralized with a base having an alkali metal cation. The thermoplastic copolymer has a high glass transition temperature and melt processing tempera- (Continued)

ture, and is thermally stable at its melt processing temperature. The neutralized thermoplastic copolymer is soluble in an alkaline aqueous solution.

18 Claims, 9 Drawing Sheets

(51) Int. Cl.
| | | |
|---|---|---|
| C08F 212/08 | (2006.01) | |
| C08F 220/06 | (2006.01) | |
| C08F 2/38 | (2006.01) | |
| B29C 64/106 | (2017.01) | |
| B29C 64/40 | (2017.01) | |
| B29K 25/00 | (2006.01) | |
| B29K 33/00 | (2006.01) | |
| B29K 105/00 | (2006.01) | |

(52) U.S. Cl.
CPC .............. *C08F 2/38* (2013.01); *C08F 212/08* (2013.01); *C08F 220/06* (2013.01); *B29K 2025/08* (2013.01); *B29K 2033/08* (2013.01); *B29K 2105/0085* (2013.01); *C08F 2438/02* (2013.01)

(58) Field of Classification Search
CPC ... B29C 64/106; B29C 64/112; B29C 64/118; B29C 64/124; B29C 64/141; B29C 64/147; B29C 64/153; B29C 64/165; B29C 64/171; B29C 64/176; B29C 64/188; B29C 64/194; B29C 64/20; B29C 64/205; B29C 64/245; B29C 64/307; B29C 64/40
See application file for complete search history.

(56) References Cited

U.S. PATENT DOCUMENTS

| | | |
|---|---|---|
| 5,132,143 A | 7/1992 | Deckard |
| 5,204,055 A | 4/1993 | Sachs et al. |
| 5,503,785 A | 4/1996 | Crump et al. |
| 6,004,124 A | 12/1999 | Swanson et al. |
| 7,122,246 B2 | 10/2006 | Comb et al. |
| 7,384,255 B2 | 6/2008 | LaBossiere et al. |
| 7,604,470 B2 | 10/2009 | LaBossiere et al. |
| 7,625,200 B2 | 12/2009 | Leavitt |
| 7,896,209 B2 | 3/2011 | Batchelder et al. |
| 8,153,182 B2 | 4/2012 | Comb et al. |
| 8,221,669 B2 | 7/2012 | Batchelder et al. |
| 8,221,858 B2 | 7/2012 | Mannella et al. |
| 8,236,227 B2 | 8/2012 | Batchelder et al. |
| 8,246,888 B2 | 8/2012 | Hopkins et al. |
| 8,419,996 B2 | 4/2013 | Swanson et al. |
| 8,459,280 B2 | 6/2013 | Swanson et al. |
| 8,647,102 B2 | 2/2014 | Swanson et al. |
| 8,658,250 B2 | 2/2014 | Batchelder et al. |
| 2005/0004282 A1* | 1/2005 | Priedeman, Jr. ........ B29C 41/08 524/115 |
| 2010/0096072 A1* | 4/2010 | Hopkins ................ C08L 25/08 156/155 |
| 2010/0283172 A1 | 11/2010 | Swanson |
| 2011/0074065 A1 | 3/2011 | Batchelder et al. |
| 2011/0186081 A1 | 8/2011 | Dunn et al. |
| 2012/0070523 A1 | 3/2012 | Swanson et al. |
| 2012/0070619 A1 | 3/2012 | Mikulak et al. |
| 2012/0164256 A1 | 6/2012 | Swanson et al. |
| 2012/0231225 A1 | 9/2012 | Mikulak et al. |
| 2013/0077996 A1 | 3/2013 | Hanson et al. |
| 2013/0077997 A1 | 3/2013 | Hanson et al. |
| 2013/0161439 A1 | 6/2013 | Beery et al. |
| 2013/0161442 A1 | 6/2013 | Mannella et al. |
| 2013/0186549 A1 | 7/2013 | Comb et al. |
| 2013/0186558 A1 | 7/2013 | Comb et al. |
| 2013/0333798 A1 | 12/2013 | Bosveld et al. |

FOREIGN PATENT DOCUMENTS

| | | |
|---|---|---|
| WO | 2006020279 A2 | 2/2006 |
| WO | 2010045147 A2 | 4/2010 |
| WO | 2015009789 A1 | 1/2015 |

OTHER PUBLICATIONS

European Communication pursuant to Article 94(3) EPC dated Mar. 15, 2019 for corresponding European Application No. 15726799.8, filed Nov. 17, 2016.

* cited by examiner

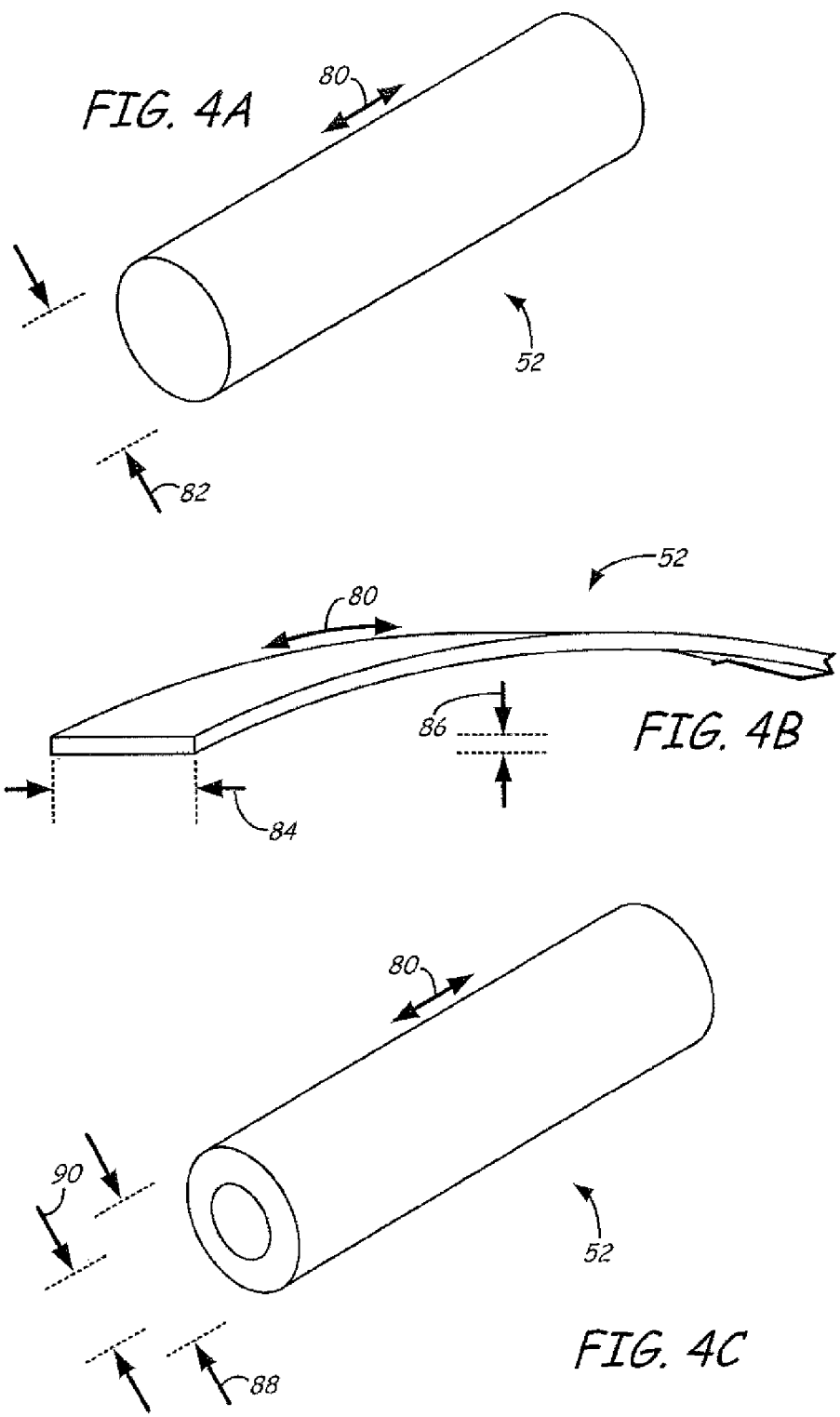

HIGH-TEMPERATURE SOLUBLE SUPPORT MATERIAL FOR ADDITIVE MANUFACTURING

CROSS-REFERENCE TO RELATED APPLICATION(S)

This Application is a 371 National Stage Application of International Application No. PCT/US2015/030603, filed on May 13, 2015, published as International Publication No. WO 2015/175682A1, which claims priority to U.S. Provisional Patent Application No. 61/994,345, filed on May 16, 2014, the contents of which are incorporated by reference in their entireties.

BACKGROUND

The present disclosure relates to additive manufacturing systems for printing three-dimensional (3D) parts and support structures. In particular, the present disclosure relates to support materials for use in additive manufacturing systems, consumable assemblies retaining the support materials, and methods of manufacturing and using the support materials and assemblies in additive manufacturing systems to print 3D parts.

Additive manufacturing systems are used to print or otherwise build 3D parts from digital representations of the 3D parts (e.g., AMF and STL format files) using one or more additive manufacturing techniques. Examples of commercially available additive manufacturing techniques include extrusion-based techniques, jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to print the given layer.

For example, in an extrusion-based additive manufacturing system, a 3D part may be printed from a digital representation of the 3D part in a layer-by-layer manner by extruding a flowable part material. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of 3D parts under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited from a second nozzle pursuant to the generated geometry during the printing process. The support material adheres to the part material during fabrication, and is removable from the completed 3D part when the printing process is complete.

SUMMARY

An aspect of the present disclosure is directed to a soluble polymeric material for use in an additive manufacturing system. The material includes a thermoplastic copolymer comprising carboxylic acid groups wherein a portion of the carboxylic acid groups are neutralized to form carboxylic acid salt groups, wherein the glass transition temperature of the thermoplastic copolymer is greater than about 120° C. and wherein the thermoplastic copolymer is disintegrable in an alkaline aqueous solution or dispersion. The polymeric material is configured for use in the additive manufacturing system for printing a support structure from the material in coordination with printing of a 3D part.

The material includes a thermoplastic copolymer polymerized from monomers comprising one or more acid-functional monomers having carboxylic acid groups, and one or more additional, non-acid-functional monomers, where a portion of the carboxylic acid groups are neutralized, and in some embodiments, a second portion of the carboxylic acid groups are anhydrized. The carboxylic groups are neutralized with a basic substance. The basic substances include alkali metal cations including, but not limited to, potassium hydroxide, sodium hydroxide, lithium hydroxide and potassium bicarbonate. The thermoplastic copolymer has a glass transition temperature greater than about 120° C., and a melt processing temperature great than a melt processing temperature of the thermoplastic copolymer in a pre-neutralized form. The thermoplastic copolymer is also thermally stable at its melt processing temperature. The polymeric material is disintegrable in an alkaline, aqueous solution or dispersion.

Another aspect of the present disclosure is directed to a material for use in an additive manufacturing system, where the support material includes a thermoplastic copolymer polymerized from monomers comprising one or more (meth)acrylic acid monomers having carboxylic acid groups, one or more ethylenically-unsaturated aromatic monomers, and optionally, one or more additional monomers, where a portion of the carboxylic acid groups are neutralized, and in some embodiments, a second portion of the carboxylic acid groups are anhydrized. The carboxylic groups are neutralized with a basic substance. The basic substance includes alkali metal cations including, but not limited to, potassium hydroxide, sodium hydroxide, lithium hydroxide and potassium bicarbonate. The thermoplastic copolymer has a high glass transition temperature (e.g., greater than about 180° C.), a high melt processing temperature (e.g., greater than about 250° C.), is thermally stable at its melt processing temperature, and is soluble in an alkaline aqueous dispersion. Preferably, the glass transition temperature of the thermoplastic copolymer is within 10° C. of a glass transition temperature of an associated part material. The material is configured for use in the additive manufacturing system for printing a support structure from the support material in coordination with printing of a 3D part from the part material.

Another aspect of the present disclosure is directed to a method for printing a 3D part with an additive manufacturing system. The method includes providing a support material having a thermoplastic copolymer comprising carboxylic acid groups wherein a portion of the carboxylic acid groups are neutralized by a basic substance to form carboxylic acid salt groups, wherein the thermoplastic copolymer is soluble in an alkaline aqueous solution and wherein the support material is configured to for use in the additive manufacturing system. The method also includes printing the three-dimensional part with part material and support material wherein the glass transition temperature of the support material is higher than about 120° C. and the melt processing temperature is greater than about 220° C.

The method includes providing a support material having a thermoplastic copolymer polymerized from monomers comprising one or more acid-functional monomers having carboxylic acid groups, and one or more additional, non-acid-functional monomers, where a portion of the carboxylic acid groups are neutralized, and in some embodiments, a second portion of the carboxylic acid groups are anhydrized. The carboxylic groups are neutralized with a basic substance. The basic substances include alkali metal cations, including but not limited to, potassium hydroxide, sodium hydroxide, lithium hydroxide and potassium bicarbonate.

The method also includes heating a chamber of the additive manufacturing system to an elevated temperature (e.g., at least 150° C.), melting the support material with a high melt processing temperature (e.g., greater than about 250° C.), and forming layers of a support structure from the molten support material in the heated chamber, where less than 10% by weight of the thermoplastic copolymer of the formed support structure layers is thermally degraded. The method also includes forming layers of the 3D part from a part material in coordination with forming the support structure layers in the heated chamber, and disintegrating at least a portion of the support structure in an aqueous solution.

Another aspect of the present disclosure is directed to a method for producing a support material. The method includes providing a thermoplastic copolymer having carboxyl acid groups neutralizing a portion of the carboxylic acid groups of a thermoplastic copolymer with a base to form carboxylic acid salt groups and compounding the neutralized thermoplastic copolymer into a media form, wherein the glass transition temperature of the thermoplastic copolymer is greater than about 120° C., and wherein the thermoplastic copolymer is soluble in an alkaline aqueous solution or dispersion.

The method also includes polymerizing a pre-neutralized thermoplastic copolymer from monomers comprising one or more acid-functional monomers having carboxylic acid groups, and one or more additional non-acid-functional monomers, where, optionally, some of the carboxylic acid groups are anhydrized, and where the pre-neutralized thermoplastic copolymer has a first glass transition temperature and a first melt processing temperature.

The method also includes neutralizing a portion of the carboxylic acid groups with a basic substance to produce a neutralized thermoplastic copolymer having a second glass transition temperature that is greater than the first glass transition temperature, and a second melt processing temperature that is greater than the first melt processing temperature, and wherein the neutralized thermoplastic copolymer has a thermal stability such that less than 10% by weight of the neutralized thermoplastic copolymer thermally degrades when the neutralized thermoplastic copolymer is exposed to the second melt processing temperature for a 5-minute duration. The method further includes compounding the neutralized thermoplastic copolymer into a media form for use in the additive manufacturing system for printing a support structure from the support material in coordination with printing of a 3D part.

Another aspect of the present disclosure is directed to producing a soluble polymeric material for use in an additive manufacturing system. The material includes a substantially miscible blend that comprises a neutralized thermoplastic copolymer and a thermoplastic copolymer in a pre-neutralized form. The neutralized thermoplastic copolymer is polymerized from first monomers comprising one or more first acid-functional monomers having carboxylic acid groups, and one or more first additional, non-acid-functional monomers, where a first portion of the carboxylic acid groups of the first acid-functional monomers are neutralized, and where, optionally, a second portion of the carboxylic acid groups are anhydrized. The carboxylic groups are neutralized with a basic substance. The basic substances include alkali metal cations, where the substances include, but are not limited to, potassium hydroxide, sodium hydroxide, lithium hydroxide and potassium bicarbonate.

The pre-neutralized thermoplastic copolymer is polymerized from second monomers comprising one or more second acid-functional monomers having carboxylic acid groups, and one or more second additional, non-acid-functional monomers, where, optionally, some of the carboxylic acid groups from the second acid-functional monomers are anhydrized, and where the blend has a glass transition temperature greater than about 100° C., and a thermal stability such that less than 10% by weight of the thermoplastic copolymer thermally degrades when the thermoplastic copolymer is printed with the additive manufacturing system. The thermoplastic copolymer is disintegrable in an alkaline aqueous solution or dispersion, and is configured for use in the additive manufacturing system for printing a support structure from the support material in coordination with printing of a 3D part.

Another aspect of the present disclosure is directed to a water soluble polymeric support material for use in an electrophotography-based additive manufacturing system. The material includes a composition comprising a thermoplastic copolymer and a charge control agent. The thermoplastic copolymer is polymerized from monomers comprising one or more acid-functional monomers having carboxylic acid groups, and one or more additional non-acid-functional monomers, where a first portion of the carboxylic acid groups are neutralized, and wherein, optionally, a second portion of the carboxylic acid groups are anhydrized. The carboxylic groups are neutralized with a basic substance. The basic substances include alkali metal cations, where the substances include, but are not limited to, potassium hydroxide, sodium hydroxide, lithium hydroxide and potassium bicarbonate.

The thermoplastic copolymer has a glass transition temperature greater than about 120° C., a melt processing temperature greater than a melt processing temperature of the thermoplastic copolymer in a pre-neutralized form, and a thermal stability such that less than 10% by weight of the thermoplastic copolymer thermally degrades when the thermoplastic copolymer is exposed to the melt processing temperature for a 5-minute duration.

The composition is provided in a powder form having a D50 particle size ranging from about 5 micrometers to about 30 micrometers, and is disintegrable in an alkaline aqueous solution or dispersion. Furthermore, the support material is configured for use in the electrophotography-based additive manufacturing system having a layer transfusion assembly for printing the support structure in a layer-by-layer manner in coordination with printing a 3D part.

Definitions

Unless otherwise specified, the following terms as used herein have the meanings provided below:

The term "polymer" refers to a polymerized molecule having one or more monomer species, and includes homopolymers and copolymers. The term "copolymer"

refers to a polymer having two or more monomer species, and includes terpolymers (i.e., copolymers having three monomer species).

The terms "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the inventive scope of the present disclosure.

Reference to "a" chemical compound refers one or more molecules of the chemical compound, rather than being limited to a single molecule of the chemical compound. Furthermore, the one or more molecules may or may not be identical, so long as they fall under the category of the chemical compound. Thus, for example, "a" polyetherimide is interpreted to include one or more polymer molecules of the polyetherimide, where the polymer molecules may or may not be identical (e.g., different molecular weights and/or isomers).

The terms "at least one and one or more of" an element are used interchangeably, and have the same meaning that includes a single element and a plurality of the elements, and may also be represented by the suffix "(s)" at the end of the element. For example, "at least one polyetherimide", "one or more polyetherimides", and "polyetherimide(s)" may be used interchangeably and have the same meaning.

The term "providing", such as for "providing a support material", when recited in the claims, is not intended to require any particular delivery or receipt of the provided item. Rather, the term "providing" is merely used to recite items that will be referred to in subsequent elements of the claim(s), for purposes of clarity and ease of readability.

Unless otherwise specified, temperatures referred to herein are based on atmospheric pressure (i.e. one atmosphere). The term "high temperature" refers to temperatures greater than about 120° C.

The terms "about" and "substantially" are used herein with respect to measurable values and ranges due to expected variations known to those skilled in the art (e.g., limitations and variabilities in measurements).

"Soluble" as referred to herein is used interchangeably with "disintegrable" and relates to materials that can disintegrate in a solution or dispersion. Upon disintegration, the support material can break apart into smaller pieces and/or particles of polymer in the solution or dispersion. Some or all of the support material may also dissolve into the solution or dispersion upon disintegration.

BRIEF DESCRIPTION OF THE DRAWINGS

FIG. 4A is a perspective view of a segment of a cylindrical filament of the support material.

FIG. 4B is a perspective view of a segment of a ribbon filament of the support material.

FIG. 4C is a perspective view of a segment of a hollow filament of the support material.

DETAILED DESCRIPTION

Figure 1:
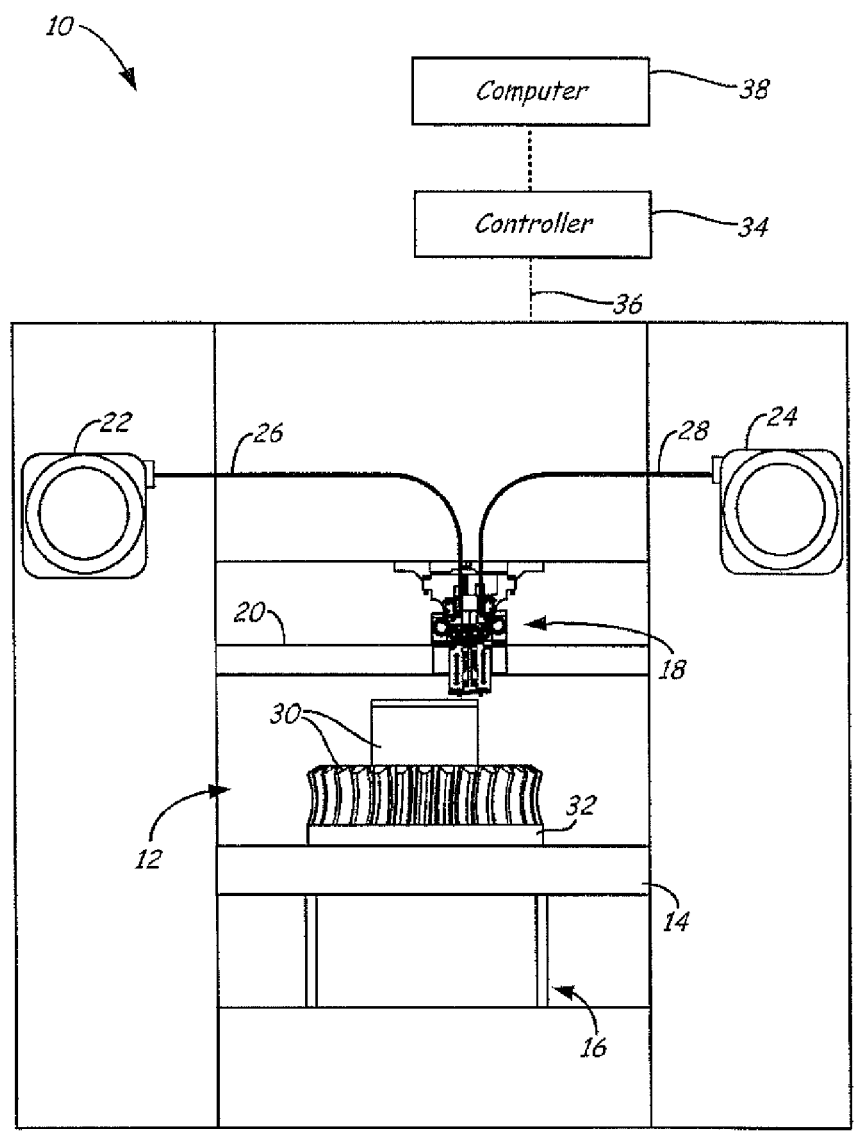
FIG. 1 is a front view of an extrusion-based additive manufacturing system configured to print 3D parts and support structures, where the support structures are printed from a support material of the present disclosure.

The present disclosure is directed to a support material, and more preferably a high-temperature support material, for printing soluble support structures in additive manufacturing systems. The support material of the present disclosure functions as a sacrificial material for an associated part material (preferably a high-performance part material), and is desirable in cases where overhanging features are required in the final 3D part structure, where significant angular slopes exist in the 3D part, where it is essential to also preserve delicate features in the 3D part, such as small orifices or controlled pore structures, and in some situations, to laterally encase the 3D part.

Once the 3D part has been printed, the support structure of the support material may be removed to reveal the completed 3D part, preferably without damaging any of the critical or delicate geometrical features of the 3D part. To accomplish this removal, the support material is at least partially disintegrable in an aqueous alkaline solution or dispersion, allowing the support structure to be at least partially and typically completely disintegrate away from the 3D part.

In order to effectively print a support structure in a layer-by-layer manner in coordination with a 3D part, the support material preferably has a glass transition temperature that is substantially similar to that of the part material. This allows the part and support materials to have similar heat deflection temperatures and other thermal characteristics when printed together as a material pair. For example, similar glass transition and heat deflection temperatures allow the part and support materials to be printed together in the same heated environment to prevent excessive distortions and curling.

Soluble support materials have traditionally been paired with lower-temperature part materials, such as acrylonitrile-butadiene-styrene (ABS) part materials, which typically have glass transition temperatures around 105° C. At these lower temperatures, current soluble support materials can be melt processed (e.g., melted and extruded from a print head) at lower temperatures (e.g., around 200° C.) such that they do not exceed their thermal-degradation kinetics thresholds (TDKTs).

The TDKT is a time-temperature parameter that defines a rate of thermal degradation of a polymeric material, such as by depolymerization, backbone chain scission, pendant-group stripping, polymer cross linking, and/or oxidation processes. The thermal degradation of a support material can reduce the desired physical properties of the material, such as changing the glass transition temperature, disintegration characteristics, physical appearance, adhesive properties, and the like. These effects can prevent the degraded support material from functioning as a sacrificial support structure.

The TDKT reaction rate typically follows the first-order Arrhenius equation, which is substantially linear with time and exponential with temperature. As an example, for a support material exposed to a selected elevated temperature for a selected duration, increasing the exposure temperature by a small amount (e.g., about 10° C.) or reducing the exposure duration by about 50% (e.g., doubling the flow rate) may net about the same thermal reaction rates on the support material, although the particular net thermal effects may vary depending on the support material composition.

In a fused deposition modeling process, the duration component of the TDKT for a support material is typically the time required to melt and extrude the support material from a print head. This can range from about 3-10 seconds, but can be longer in some cases, such as even 90-120 seconds. These durations, along with the lower melt processing temperatures, allow the current soluble support materials to be printed while remaining below their TDKTs. As such, they may effectively produce soluble support structures without significant thermal degradation. This is also in addition to any melt processing required for filament production, which can also expose the support material to elevated temperatures for 60-120 seconds, for example.

However, these soluble support materials are typically not thermally stable and cannot be melt processed at the higher melt processing temperatures required for use with 3D parts printed from high-performance materials, such as polyphenylsulfones, polyethersulfones, polyetherimides, and the like, which can require melt processing temperatures that exceed 250° C., 280° C., or even 300° C. for some materials.

Currently, this issue is solved by printing high-performance part materials in combination with break-away support materials, which are thermally stable at the higher temperatures, but are not soluble in aqueous solutions. Rather, support structures printed from the break-away support materials are typically heated to a moderate temperature and physically broken apart from the corresponding 3D parts. While these break-away support materials are suitable for many applications, they do not provide the capability of an automated or hands-free removal process that is achievable with soluble support materials. Additionally, in some cases, the physical removal of the break-away support materials can prevent 3D parts from having critical or delicate geometrical features, features that can engage one another (e.g., gear engagements), or highly-complex interior cavities and pockets.

The support material of the present disclosure, however, is uniquely engineered for pairing with high-performance part materials (e.g., substantially same/similar glass transition temperatures), while also being thermally stable and soluble in an aqueous solution for hands-free removal. Accordingly, the support material can be melted and extruded from a print head (or with any other suitable additive manufacturing process) in a layer-by-layer manner in coordination with a high-performance part material with no appreciable thermal degradation.

As discussed further below, the support material compositionally includes a thermoplastic copolymer derived from one or more acid-functional monomers (e.g., (meth)acrylic acid monomers) and one or more additional, non-acid-functional monomers (e.g., ethylenically-unsaturated aromatic monomers), where carboxylic acid groups from the acid-functional monomers are partially neutralized by a basic substance to (i) achieve a glass transition temperature that is the same as or similar to a glass transition temperature of an associated part material, (ii) achieve a melt processing temperature that the support material remains thermally stable, and (iii) maintain a suitable level of solubility in an alkaline aqueous solution. The neutralized polymer can be referred to as an ionomer. Ionomer as used herein is a polymer that carries an ionic charge due to a neutralization reaction.

It has been found that if the level of neutralization is too low, the glass transition temperature of the support material will not be high enough for use with high-performance part materials. Conversely, if the level of neutralization is too high, the melt processing temperature required to melt and extrude the support material from a print head will exceed its TDKT, resulting in thermal degradation of the support material. Accordingly, the level of neutralization is uniquely balanced for paired use with an associated high-performance part material, thereby providing a high-temperature, soluble support material.

High-temperature soluble support material refers to support materials that can be used in printing 3D parts having high-performance part materials or part materials that can be printed at high temperatures. In some embodiments, high-temperature support materials are used as support materials for printing at temperatures greater than about 200° C., preferably greater than about 250° C. In addition, the solubility of the support material is sufficient for use of removal of the support material in an automated process or hands-free manner as described below.

The support material of the present disclosure may be configured for use with several different additive manufacturing techniques, such as extrusion-based additive manufacturing systems, selective laser sintering systems, electrophotography-based additive manufacturing systems, and the like. Further, the use of the disclosed material is not limited to additive manufacturing. As shown in FIG. 1, system 10 is an example of an extrusion-based additive manufacturing system for printing or otherwise building 3D parts and support structures using a layer-based, additive manufacturing technique, where the support structures may be printed from the support material of the present disclosure. Suitable extrusion-based additive manufacturing systems for system 10 include fused deposition modeling systems developed by Stratasys, Inc., Eden Prairie, Minn. under the trademark "FDM".

In the shown embodiment, system 10 includes chamber 12, platen 14, platen gantry 16, print head 18, head gantry 20, and consumable assemblies 22 and 24. Chamber 12 is an enclosed environment that contains platen 14 for printing 3D parts and support structures. Chamber 12 may be heated (e.g., with circulating heated air) to reduce the rate at which the part and support materials solidify after being extruded and deposited.

Alternatively, the heating may be localized rather than in an entire chamber 12. For example, the deposition region may be heated in a localized manner Example techniques for locally-heating a deposition region include heating platen 14 and/or with directing heat air jets towards platen 14 and/or the 3D parts/support structures being printed). The heating anneals the printed layers of the 3D parts (and support structures) to partially relieve the residual stresses, thereby reducing curling of the 3D parts and support structures.

Platen 14 is a platform on which 3D parts and support structures are printed in a layer-by-layer manner. In some embodiments, platen 14 may also include a flexible polymeric film or liner on which the 3D parts and support structures are printed. In the shown example, print head 18 is a dual-tip extrusion head configured to receive consumable filaments from consumable assemblies 22 and 24 (e.g., via guide tubes 26 and 28) for printing 3D part 30 and support structure 32 on platen 14. Consumable assembly 22 may contain a supply of a part material, such as a high-performance part material, for printing 3D part 30 from the part material. Consumable assembly 24 may contain a supply of a support material of the present disclosure for printing support structure 32 from the given support material.

Platen 14 is supported by platen gantry 16, which is a gantry assembly configured to move platen 14 along (or substantially along) a vertical z-axis. Correspondingly, print head 18 is supported by head gantry 20, which is a gantry assembly configured to move print head 18 in (or substantially in) a horizontal x-y plane above chamber 12.

In an alternative embodiment, platen 14 may be configured to move in the horizontal x-y plane within chamber 12, and print head 18 may be configured to move along the z-axis. Other similar arrangements may also be used such that one or both of platen 14 and print head 18 are moveable relative to each other. Platen 14 and print head 18 may also be oriented along different axes. For example, platen 14 may be oriented vertically and print head 18 may print 3D part 30 and support structure 32 along the x-axis or the y-axis.

System 10 also includes controller 34, which is one or more control circuits configured to monitor and operate the components of system 10. For example, one or more of the control functions performed by controller 34 can be implemented in hardware, software, firmware, and the like, or a combination thereof. Controller 34 may communicate over communication line 36 with chamber 12 (e.g., with a heating unit for chamber 12), print head 18, and various sensors, calibration devices, display devices, and/or user input devices.

System 12 and/or controller 34 may also communicate with computer 38, which is one or more computer-based systems that communicates with system 12 and/or controller 34, and may be separate from system 12, or alternatively may be an internal component of system 12. Computer 38 includes computer-based hardware, such as data storage devices, processors, memory modules, and the like for generating and storing tool path and related printing instructions. Computer 38 may transmit these instructions to system 10 (e.g., to controller 34) to perform printing operations.

Figure 2:
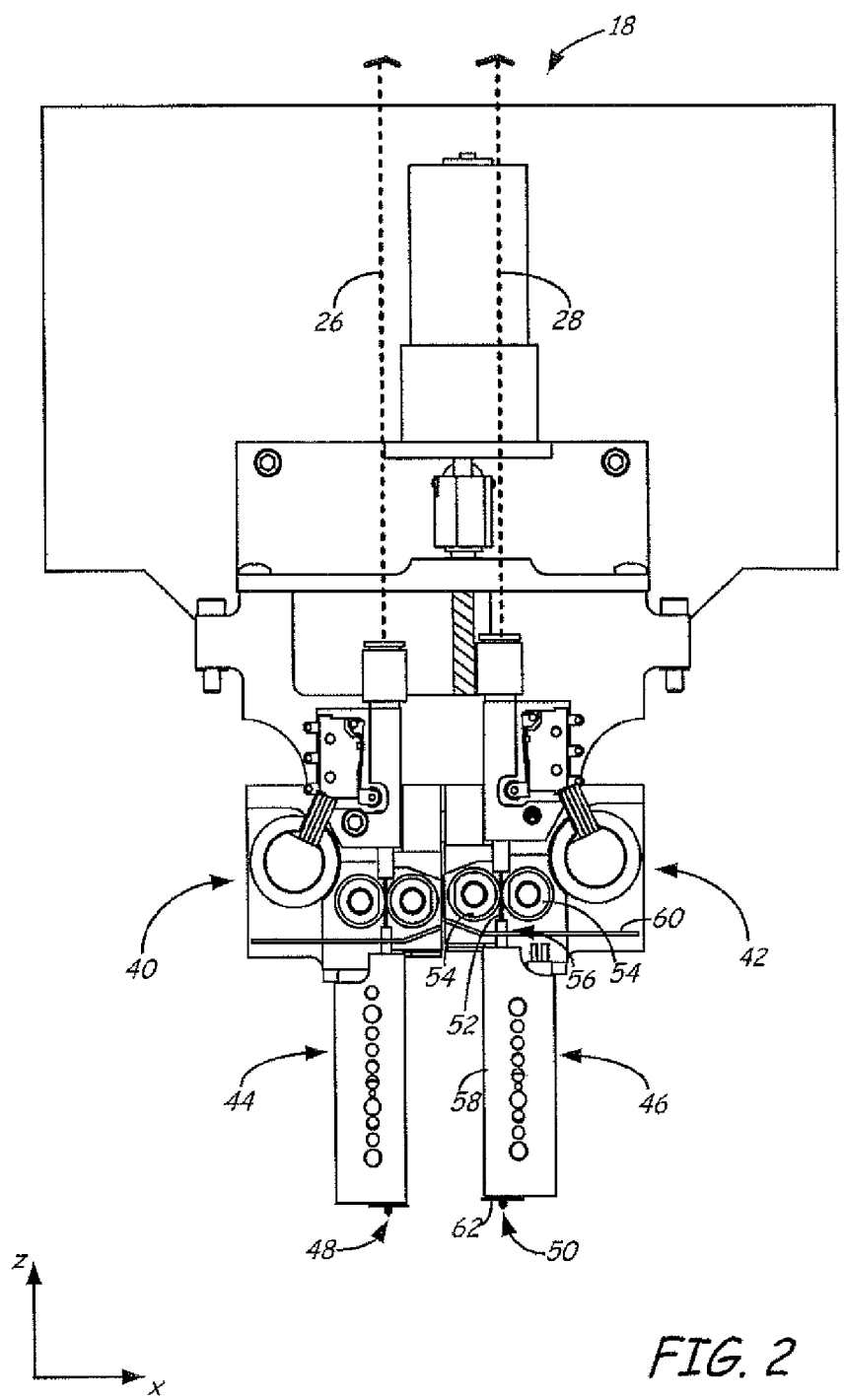
FIG. 2 is a front view of a print head of the extrusion-based additive manufacturing system.

FIG. 2 illustrates a suitable device for print head 18, as described in Leavitt, U.S. Pat. No. 7,625,200. Additional examples of suitable devices for print head 18, and the connections between print head 18 and head gantry 20 include those disclosed in Crump et al., U.S. Pat. No. 5,503,785; Swanson et al., U.S. Pat. No. 6,004,124; LaBossiere, et al., U.S. Pat. Nos. 7,384,255 and 7,604,470; Leavitt, U.S. Pat. No. 7,625,200; Batchelder et al., U.S. Pat. No. 7,896,209; and Comb et al., U.S. Pat. No. 8,153,182. In additional embodiments, in which print head 18 is an interchangeable, single-nozzle print head, examples of suitable devices for each print head 18, and the connections between print head 18 and head gantry 20 include those disclosed in Swanson et al., U.S. Pat. Nos. 8,419,996 and 8,647,102.

Figure 3:
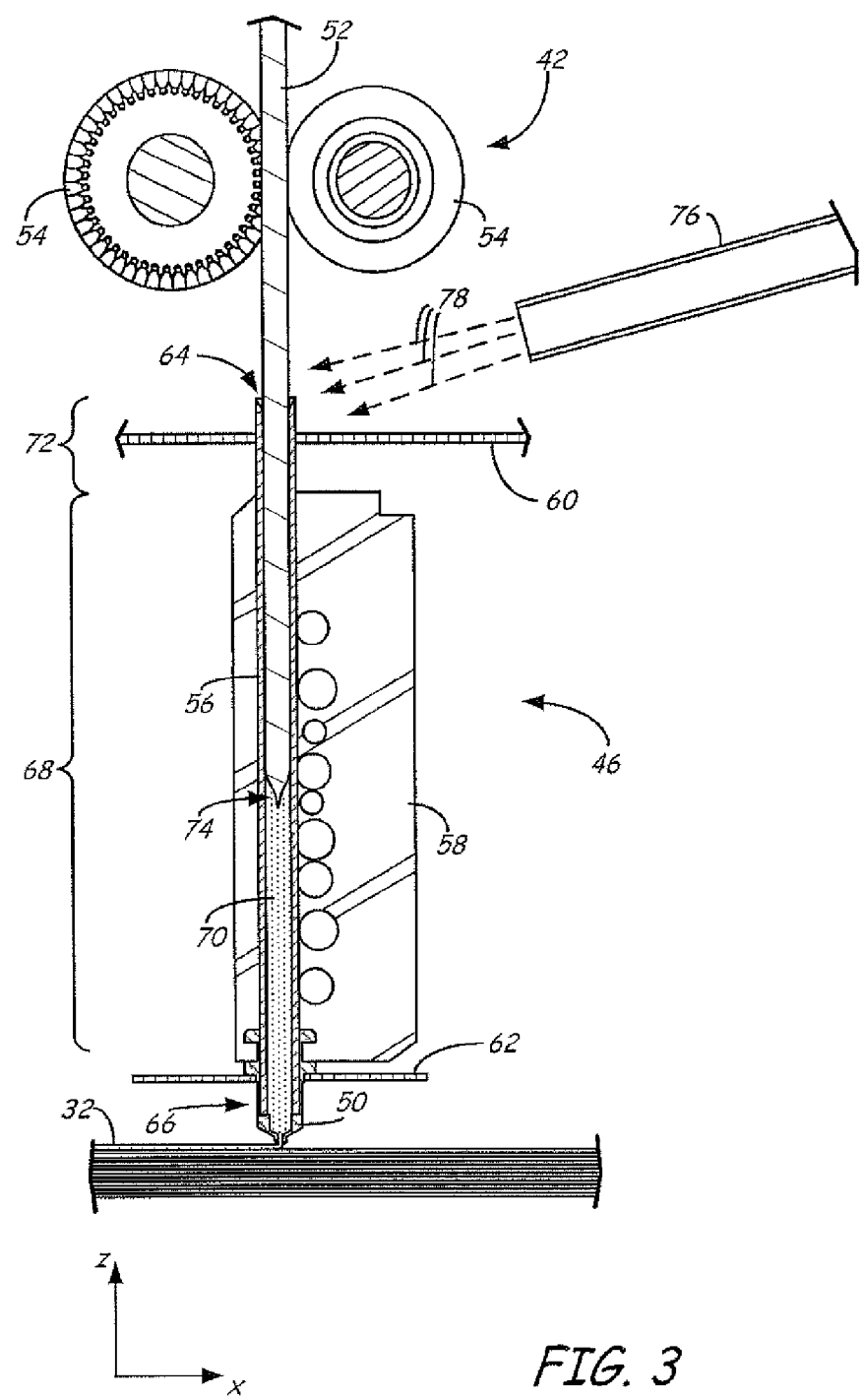
FIG. 3 is an expanded sectional view of a drive mechanism, a liquefier assembly, and a nozzle of the print head for use in the extrusion-based additive manufacturing system.

In the shown dual-tip embodiment, print head 18 includes two drive mechanisms 40 and 42, two liquefier assemblies 44 and 46, and two nozzles 48 and 50, where drive mechanism 40, liquefier assembly 44, and nozzle 48 are for receiving and extruding the part material, and drive mechanism 42, liquefier assembly 46, and nozzle 50 are for receiving and extruding the support material of the present disclosure. In this embodiment the part material and the support material each preferably have a filament geometry for use with print head 18. For example, as shown in FIGS. 2 and 3, the support material may be provided as filament 52.

During operation, controller 34 may direct wheels 54 of drive mechanism 42 to selectively draw successive segments filament 52 (of the support material) from consumable assembly 24 (via guide tube 28), and feed filament 52 to liquefier assembly 46. Liquefier assembly 46 may include liquefier tube 56, thermal block 58, heat shield 60, and tip shield 62, where liquefier tube 56 includes inlet end 64 for receiving the fed filament 52. Nozzle 50 and tip shield 62 are accordingly secured to outlet end 66 of liquefier tube 56, and liquefier tube 56 extends through thermal block 58 and heat shield 60.

While liquefier assembly 46 is in its active state, thermal block 58 heats liquefier tube 56 to define heating zone 68. The heating of liquefier tube 56 at heating zone 68 melts the support material of filament 52 in liquefier tube 56 to form melt 70. Preferred liquefier temperatures for the support material range will vary depending on the particular copolymer composition and level of neutralization, and are preferably above the melt processing temperature of the support material, while also allowing the support material to remain below its TDKT for the expected residence time in liquefier tube 56.

The upper region of liquefier tube 56 above heating zone 68, referred to as transition zone 72, is preferably not directly heated by thermal block 58. This generates a thermal gradient or profile along the longitudinal length of liquefier tube 56.

The molten portion of the support material (i.e., melt 70) forms meniscus 74 around the unmelted portion of filament 52. During an extrusion of melt 70 through nozzle 50, the downward movement of filament 52 functions as a viscosity pump to extrude the support material of melt 70 out of nozzle 50 as extruded roads to print support structure 32 in a layer-by-layer manner in coordination with the printing of 3D part 30. While thermal block 58 heats liquefier tube 56 at heating zone 68, cooling air may also be blown through an optional manifold 76 toward inlet end 64 of liquefier tube 56, as depicted by arrows 78. Heat shield 60 assists in directing the air flow toward inlet end 64. The cooling air reduces the temperature of liquefier tube 56 at inlet end 64, which prevents filament 52 from softening or melting at transition zone 72.

In some embodiments, controller 34 may servo or swap liquefier assemblies 44 and 46 between opposing active and stand-by states. For example, while liquefier assembly 46 is servoed to its active state for extruding the support material to print a layer of support structure 32, liquefier assembly 44 is switched to a stand-by state to prevent the part material from being extruded while liquefier assembly 46 is being used. After a given layer of the support material is completed, controller 34 then servoes liquefier assembly 46 to its stand-by state, and switches liquefier assembly 44 to its active state for extruding the part material to print a layer of 3D part 30. This servo process may be repeated for each printed layer until 3D part 30 and support structure 32 are completed.

While liquefier assembly 44 is in its active state for printing 3D part 30 from a part material filament, drive mechanism 40, liquefier assembly 44, and nozzle 48 (each shown in FIG. 2) may operate in the same manner as drive mechanism 42, liquefier assembly 46, and nozzle 50 for extruding the part material. In particular, drive mechanism 40 may draw successive segments of the part material filament from consumable assembly 22 (via guide tube 26), and feed the part material filament to liquefier assembly 44. Liquefier assembly 44 thermally melts the successive portions of the received part material filament such that it becomes a molten part material. The molten part material may then be extruded and deposited from nozzle 48 as a series of roads onto platen 14 for printing 3D part 30 in a layer-by-layer manner in coordination with the printing of support structure 32.

After the print operation is complete, the resulting 3D part 30 and support structure 32 may be removed from chamber 12. Support structure 32 may then be sacrificially removed from 3D part 30, such as by contact with an alkaline aqueous solution. Examples of suitable removal units for disintegrating support structure 32 include those disclosed in Swanson et al., U.S. Pat. No. 8,459,280. Under this soluble technique, support structure 32 may at least partially disintegrate in the aqueous solution, separating it from 3D part 30 in a hands-free manner.

As mentioned above, the support material of the present disclosure compositionally includes a thermoplastic copolymer derived from one or more acid-functional monomers and one or more additional, non-acid-functional monomers, where carboxylic acid groups from the one or more acid-functional monomers are partially neutralized to an extent that achieves a desired balance between its glass transition temperature and melt processing temperature.

Examples of acid-functional monomers include (meth) acrylic acid monomers having the following structure:

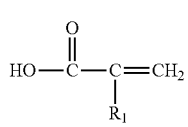
(Formula 1)

where $R_1$ is a hydrogen atom, or an alkyl or ether group having 1-3 carbon atoms (more preferably an alkyl group, such as a methyl group). The term "(meth)acrylic acid" refers generically to acrylic acid and methacrylic acid. Furthermore, in some embodiments, the ethylenically-unsaturated group and the carboxylic acid group may be separated by an optional chain linkage, such as a hydrocarbon or ether linkage having 1-8 carbon atoms. In its simplest form, the term "carboxylic acid group" refers to a —C(O)OH carboxyl group. More preferably, the (meth)acrylic acid monomer includes the structure shown above in Formula 1, with the ethylenically-unsaturated vinyl group extending directly from the carboxylic acid group, and most preferably where $R_1$ is a methyl group (i.e., methacrylic acid).

The (meth)acrylic acid monomers used to produce the thermoplastic copolymer may constitute from about 25% to about 75% by weight, and more preferably from about 30% to about 65% by weight. In some embodiments, the (meth) acrylic acid monomers used to produce the thermoplastic copolymer may constitute from about 40% to about 60% by weight, and more preferably from about 45% to about 55% by weight, based on the entire weight of monomers used to produce the thermoplastic copolymer.

The one or more additional, non-acid-functional monomers may include any suitable monomer that preferably do not significantly detract from the strength, chemical, or thermal properties of the thermoplastic copolymer. Examples of additional, non-acid-functional monomers include ethylenically-unsaturated aromatic monomers having the following structure:

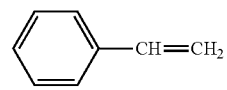
(Formula 2)

where, in some embodiments, the hydrogen atoms in Formula 2 may be independently substituted with one or more optional low-atomic weight groups, such as an alkyl or ether group having 1-3 carbon atoms. Furthermore, in some embodiments, the ethylenically-unsaturated group and the aromatic group may be separated by an optional chain linkage, such as a hydrocarbon or ether linkage having 1-8 carbon atoms.

In some further embodiments, one or more hydrogen atoms of the aromatic group may be independently substituted with one or more optional low-atomic weight groups, such as an alkyl or ether group having 1-3 carbon atoms. More preferably, the aromatic monomer includes the structure shown above in Formula 2, with the ethylenically-unsaturated vinyl group extending directly from the aromatic group (i.e., styrene).

The ethylenically-unsaturated aromatic monomers used to produce the thermoplastic copolymer may constitute from about 20% to about 70% by weight, and more preferably from about 25% to about 60% by weight, based on an entire weight of monomers used to produce the thermoplastic copolymer. In some embodiments, the ethylenically-unsaturated aromatic monomers used to produce the thermoplastic copolymer may constitute from about 40% to about 60% by weight, and more preferably from about 45% to about 55% by weight, based on the entire weight of monomers used to produce the thermoplastic copolymer.

The thermoplastic copolymer may include monomers that function as chain extending units (e.g., ethylene units) for the copolymer backbone. The additional chain-extending monomers may collectively constitute from 0% by weight to about 10% by weight, based on the entire weight of the monomers used to produce the thermoplastic copolymer. In some embodiment, the additional monomers may constitute from about 0.1% to about 5% by weight, based on the entire weight of the monomers used to produce the thermoplastic copolymer.

In further embodiments, the additional monomers used to polymerize the thermoplastic copolymer may include one or more alkyl (meth)acrylate monomers. In these embodiments, example alkyl (meth)acrylate monomers have the following structure:

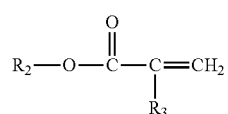
(Formula 3)

where $R_2$ is a hydrocarbon chain having 1-8 carbon atoms (more preferably 2-5 carbon atoms). $R_3$ is a hydrogen atom, or an alkyl or ether group having 1-3 carbon atoms (more preferably a hydrogen atom). Furthermore, in some embodiments, the ethylenically-unsaturated group and the carbonyl group may be separated by an optional chain linkage, such as a hydrocarbon or ether linkage having 1-8 carbon atoms.

In some embodiments, the alkyl (meth)acrylate monomer includes the structure shown above in Formula 3, with the ethylenically-unsaturated vinyl group extending directly from the carbonyl group, and most preferably where $R_2$ is a hydrocarbon chain having 2-5 carbon atoms, and $R_3$ is a hydrogen atom (e.g., an alkyl acrylate, such as butyl acrylate).

However, it is believed that the inclusion of alkyl (meth) acrylate monomers such as butyl acrylate can reduce the thermal stability of the support material in some situations when engineered for use in higher-temperature part materials, such as polyetherimides and polyphenylsulfones. As such, in some embodiments, the thermoplastic copolymer in the support material includes less than about 15% by weight, less than about 10% by weight, or even less than 5% by weight of chain segments derived from alkyl (meth)acrylate monomers (e.g., butyl acrylate). In further embodiments, the thermoplastic copolymer in the support material is substantially free or completely free of monomer units derived from alkyl (meth)acrylate monomers (e.g., butyl acrylate).

The polymerization of the thermoplastic copolymer may be performed with a free-radical polymerization reaction of the monomers, using any suitable polymerization initiator, such as, but not limited to, dibenzoyl peroxide. The polymerization is preferably performed in solution, so as to ensure the formation of a random, substantially amorphous, copolymer. For example, the polymerization reaction may be performed by charging the monomer components, along with a suitable carrier solvent (e.g., ethanol) to a reaction vessel. The reaction vessel is preferably purged with an inert gas (e.g., nitrogen) and heated to a reaction temperature (e.g., about 80° C.). The polymerization initiator may then be introduced to the reaction vessel, preferably in separate sub-doses to prevent the exothermic polymerization reaction from raising the reaction temperature to the point where excessive solvent boiling would occur.

In some embodiments, the monomers used to polymerize the thermoplastic copolymer consist essentially of, or completely of, ethylenically-unsaturated aromatic monomers and (meth)acrylic acid monomers. In some further embodiments, the monomers used to polymerize the thermoplastic copolymer consist essentially or completely of (i) styrene, and (ii) methacrylic acid and/or acrylic acid.

The polymerized thermoplastic copolymer, as synthesized by free-radical polymerization reaction from the above-discussed monomers, results in a high yield of the resulting thermoplastic copolymer and a very high conversion of the monomers-to-copolymer. Furthermore, most of the carboxylic acid groups from the acid-functional monomers remain unaffected and have the carboxylic acid groups extending as pendant groups from the copolymer backbone. However, a portion of the carboxylic acid groups from the acid-functional monomers are typically converted to anhydride groups. As such, for ease of reference, the thermoplastic copolymer at this stage may be referred to as being in the "pre-neutralized form", where the carboxylic acid groups may have the —C(O)OH structure and/or a portion of them may be anhydrized.

However, this pre-neutralized form of the thermoplastic copolymer typically has a glass transition temperature that is lower than those of high-performance part materials (e.g., greater than 160° C., 180° C., or even 200° C.). In fact, the formation of anhydride groups from a portion of the carboxylic acid groups has been found to further lower the glass transition temperature of the thermoplastic copolymer. This effectively prevents the pre-neutralized form of the thermoplastic copolymer from functioning as a support structure for the high-performance part materials unless the build environment (e.g., chamber 12) is maintained substantially below the glass transition temperature of the part material. This unfortunately can result in distortions and curling of 3D part 30.

As such, to increase the glass transition temperature of the copolymer, the available carboxylic acid groups from the acid-functional monomers are partially neutralized or ionomerized with a basic substance to form a controlled amount of carboxylic acid salt groups. Carboxylic acid salt groups include the carboxylate anion and a cation. Partially neutralized copolymers or ionomers are generally formed with a metal cation. The metal cation can be derived from a basic substance such as a basic metal, a basic aqueous solution and/or a basic salt. The basic substance can be a highly alkaline or a weakly alkaline solution or salt. The resulting partially neutralized thermoplastic copolymer or ionomer may then include monomer units having the following structure:

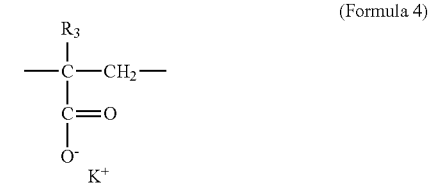

(Formula 4)

The ion "$K^+$" shown in Formula 4 is a salt ion derived, for example, from a potassium hydroxide solution or a potassium bicarbonate salt or solution, and may be replaced with any other suitable salt ion from the alkali metal group (e.g., sodium or lithium). Suitable basic substances can include basic aqueous solutions such as sodium hydroxide, lithium hydroxide, potassium hydroxide, and mixtures thereof. Suitable basic substances can also include potassium bicarbonate, sodium bicarbonate and mixtures thereof. Other salts known in the art, e.g. alkali metal cation salts, may also be suitable. Some basic substances such as potassium bicarbonate can be used for neutralization in the form of powders. Alternatively, basic aqueous solution that include potassium bicarbonate may be used as the basic substance for neutralization of the copolymer. Suitable concentrations of the basic aqueous solutions will vary depending on the desired extent of neutralization for the carboxylic acid groups.

In some embodiments, a non-hazardous basic substance is preferably used to partially neutralize the copolymer to form ionomers. In an exemplary embodiment, the copolymer is neutralized with potassium bicarbonate. Potassium bicarbonate is a volatile, non-hazardous substance and therefore easy to process. Furthermore, according to the U.S. Food and Drug Administration (FDA), potassium bicarbonate is "generally recognized as safe" (GRAS) and is often used as a food additive. The use of basic substances classified as GRAS is particularly advantageous since the process does not result in generation of hazardous waste during the processes described herein. Further, the use of potassium bicarbonate significantly reduces health risks to the personnel processing the reaction. Any waste generated in the processes can be discarded into the regular (non-hazardous)

waste stream resulting in a more economic and eco-friendly process. Advantageously, the efficiency of the neutralization of the copolymer using potassium bicarbonate is similar to the processes utilizing other alkaline aqueous solutions.

Examples of suitable concentrations of the basic aqueous solutions include those suitable to neutralize from about 10% to about 50% of the carboxylic acid groups, and more preferably from about 15% to about 25% of the carboxylic acid groups. For example, a 10% basic aqueous solution of potassium hydroxide includes a sufficient amount of potassium hydroxide in water to neutralize about 10% of the carboxylic acid groups of the copolymer.

Partial neutralization of the copolymers to form ionomers can be performed, for example, by a variety of methods including neutralization in alkaline aqueous solutions, neutralization in solution with other solvents, melt processing such as reactive extrusion and the like. In reactive extrusion, for example, the basic substance and the copolymer are coextruded one or more times through an extruder. Preferably, the basic substance and the copolymer are extruded about 3 or more times through the extruder until the basic substance is consumed. The amount of basic substance added to the copolymer prior to extrusion can vary and is dependent of the extent of neutralization desired. The amount of the basic substance included can be, for example, between about 1 percent by weight of the copolymer and about 25 percent by weight of the copolymer. In some embodiments, the amount of basic substance included is between about 3 percent by weight of the copolymer and about 15 percent by weight of the copolymer.

The extent of neutralization is preferably selected to attain a glass transition temperature that is the same as or substantially similar to that of an associated part material (e.g., a high-performance part material) that the support material is intended to be paired with. Examples of suitable glass transition temperatures for the neutralized thermoplastic copolymer of the support material include those within about 10° C. (above or below) of the glass transition temperature of the intended high-performance part material, and more preferably within about 5° C. In some preferred embodiments, the glass transition temperature of the neutralized thermoplastic copolymer of the support material is substantially the same as that of the high-performance part material.

Example high-performance part materials that the support material is preferably paired with include high-performance thermoplastic materials, such as one or more polyetherarylketones (e.g., polyetheretherketones), fluorinated thermoplastics, polyphenylsulfones, polyethersulfones, polyetherimides, polyimides, copolymers thereof, and mixtures thereof. These thermoplastics typically have glass transition temperatures greater than about 160° C., more preferably greater than about 180° C., and in some embodiments greater than about 200° C. The high-performance thermoplastic materials may also have heat deflection temperatures greater than about 150° C. (measured pursuant to ASTM D648-07), and preferably have ultimate tensile strengths of at least about 12,000 pounds/square-inch (psi), and in some embodiments, ranging from about 12,000 psi to about 15,000 psi (measured pursuant to ASTM D638-10).

In some embodiments, the extent of neutralization may be selected such to attain a desired glass transition temperatures that is greater than the glass transition temperature of the thermoplastic copolymer in a pre-neutralized form. For instance, the extent of neutralization may be controlled to achieve a glass transition temperature ranging from about between 110° C. and 140° C., or greater than about 140° C., for a thermoplastic copolymer in the pre-neutralized state. Furthermore, if the thermoplastic copolymer in the pre-neutralized form that is anhydrized to a maximum extent achievable, the extent of neutralization may be controlled to achieve a glass transition temperature greater than about 110° C.

However, the support material is preferably paired with a high-temperature part material. Therefore, the neutralized thermoplastic copolymer of the support material may have glass transition temperatures greater than about 160° C., more preferably greater than about 180° C., and in some embodiments greater than about 200° C. This is in addition to being the same as or similar to the glass transition temperature of an associated part material (e.g., within 10° C., within 5° C., and the like), as discussed above. For example, when being paired with a polyetherimide part material having a glass transition temperature of about 200° C., the thermoplastic copolymer is preferably neutralized to an extent to achieve a similar (or the same) glass transition temperature.

However, extensively neutralizing the thermoplastic copolymer generates high concentrations of salt groups, which can increase the melt processing temperature of the support material to a point where it cannot be printed without exceeding its TDKT. Accordingly, in addition to achieving the desired glass transition temperature, the extent of neutralization is also preferably balanced such that the melt processing temperature of the thermoplastic copolymer is low enough such that the support material can be printed without exceeding its TDKT. Suitable melt processing temperatures include temperatures greater than the thermoplastic copolymer in the pre-neutralized form. Examples of suitable melt processing temperatures include those greater than about 220° C. and/or greater than about 240° C.; more preferably greater than about 250° C., greater than about 275° C., and/or greater than about 300° C.; and in some embodiments, greater than about 325° C.

When used in system 10, the support material needs to be thermally stable to be melted in liquefier tube 56 and extruded from nozzle 50 without appreciable thermal degradation, which can expose the support material to a melt processing temperature for durations of 3-10 seconds, or longer in some cases (e.g., 5 seconds, 10 seconds, 30 seconds, 1 minute, 5 minutes, 10 minutes, 30 minutes, and the like). Preferably, the support material is printable with an additive manufacturing system (e.g., system 10) such that less than 10% by weight of the thermoplastic copolymer thermally degrades during the printing operation. More preferably, less than 5% by weight, even more preferably less than 1% by weight, and even more preferably less than 0.5% by weight of the thermoplastic copolymer thermally degrades during the printing operation.

In some preferred embodiments, the thermoplastic copolymer is polymerized from a monomer blend of about 40% to about 60% of one or more ethylenically-unsaturated aromatic monomers (e.g., styrene), and about 40% to about 60% of one or more (meth)acrylic acid monomers (e.g., methacrylic acid and/or acrylic acid), where the thermoplastic copolymer has about 15% to about 25% of its carboxylic acid groups neutralized (e.g., with a base having a potassium cation). These neutralization ranges increase the glass transition temperature of the resulting copolymer above about 195° C., and allow the thermoplastic copolymer to be melt processed for printing with system 10 at about 290° C.

The molecular weight of the thermoplastic copolymer of the support material can vary and may be selected, for example, based on the accompanying part material. Suitable molecular weights can be, for example, between about 5000 daltons and about 200,000 daltons, preferably the molecular weight is between about 80,000 daltons and about 150,000 daltons. Molecular weights outside of this range may also be used and are within the scope of this disclosure.

Interestingly, this copolymer can also be melted and extruded from a print head at temperatures up to about 350° C. with minimal or no thermal degradation. As such, this thermoplastic copolymer can be printed in combination with high-performance part materials such as polyetherimides and polyphenylsulfones, which previously have not been printable with soluble support materials.

As mentioned above, in some embodiments, chamber 12 may be heated to one or more elevated temperatures. Preferably, the temperature within chamber 12 is set such that a temperature at the build plane below print head 18 is held within about 30° C. below an average glass transition temperature of the part and support materials (which are preferably similar or the same), more preferably within about 25° C. the average glass transition temperature, and even more preferably within about 20° C. below the average glass transition temperature. Examples of suitable set point temperatures for chamber 12 include those greater than about 120° C., greater than 150° C., greater than about 180° C., and/or greater than about 200° C.

With respect to the solubility of the thermoplastic copolymer, it is readily capable of disintegrating in aqueous alkaline solutions. The aqueous solutions may be slightly alkaline with pHs of between about 7 and about 10 or strongly alkaline aqueous solutions, such as sodium hydroxide solutions with pHs of between about 10 and about 13. Therefore, in addition to being a high-temperature support material, it can also be removed in a hands-free manner with an aqueous alkaline solution or dispersion. Examples of suitable disintegration rates, pursuant to the Disintegration Test discussed below, include rates of at least about 3.0% by weight/minute, more preferably at least about 3.5% by weight/minute, and even more preferably at least about 4.0% by weight per minute.

In comparison, if the concentration of the (meth)acrylic acid monomers is increased to about 75% by weight of the monomer blend (i.e., about 25% by weight of the ethylenically-unsaturated aromatic monomers), the glass transition temperature can be raised up to about 210° C. for the same level of neutralization, the melt processing temperature can also be increased to about 290° C., and the solubility of the copolymer increases. However, it has been found that this copolymer will exceed its TDKT if melted and extruded from a print head at temperatures above about 250° C. As such, this copolymer cannot be printed without thermally degrading. Accordingly, the extent of neutralization is an important processing condition to attain a viable high-temperature, soluble support material.

As discussed above, neutralization of the copolymer may be performed using a variety of methods including, for example, neutralization in an aqueous solution, neutralization in solution with other solvents, melt processing and the like. In some embodiments, the copolymer can be formed and then neutralization of the copolymer can be performed in solution.

In other embodiments, the neutralization of the copolymer may be performed by melt processing at the time of extrusion. This type of process may be referred to as reactive extrusion because a chemical reaction (neutralization) is performed at the time of extrusion.

In these embodiments, the thermoplastic copolymer in the pre-neutralized form can be produced by the free-radical polymerization, as discussed above. Then, in a subsequent process, the pre-neutralized copolymer can be melt processed in an extruder with a basic substance, such as those discussed above (e.g., potassium bicarbonate, potassium hydroxide, lithium hydroxide, and sodium hydroxide). The thermoplastic copolymer may be subjected to multiple extrusion cycles in order to ensure consumption of all or desired amount of added basic substance. The resultant product may be recovered and dried for subsequent compounding into a desired consumable material.

After the neutralization step, the resulting neutralized thermoplastic copolymer may be recovered and dried. The dried, neutralized thermoplastic copolymer may be used directly to form the desired consumable material (e.g. a filament or powder). The dried, neutralized thermoplastic copolymer may also be subsequently compounded into the desired consumable material (e.g. a filament or powder). The neutralized polymer could be compounded, e.g. melt processed again, to incorporate additives, impact modifier, and the like as described below. Alternatively, the neutralization and compounding may be done as one step. For example, in reactive extrusion the neutralization may be conducted simultaneously with the incorporation of the desired additives.

As can be appreciated, some of the adjacent carboxylic acid groups of the copolymer that are not neutralized may produce anhydrides groups during the compounding step(s). The thermoplastic copolymer may be blended with one or more additional additives, if desired, such as colorants, fillers, plasticizers, impact modifiers, polymer stabilizers (e.g., antioxidants, light stabilizers, ultraviolet absorbers, and antiozonants), biodegradable additives, and combinations thereof. In embodiments that include colorants, preferred concentrations of the colorants in the support material range from about 0.1% to about 5% by weight. Suitable colorants include titanium dioxide, barium sulfate, carbon black, and iron oxide, and may also include organic dyes and pigments.

In embodiments that include fillers, preferred concentrations of the fillers in the support material range from about 1% to about 25% by weight. Suitable fillers include, but not limited to, calcium carbonate, magnesium carbonate, glass spheres, graphite, carbon black, carbon fiber, glass fiber, talc, wollastonite, mica, alumina, silica, kaolin, silicon carbide, zirconium tungstate, soluble salts, and combinations thereof.

In embodiments that include plasticizers, preferred concentrations of the plasticizers in the support material range from about 0.01% to about 25% by weight. Suitable additional plasticizers for use in the support material include, but are not limited to, dialkyl phthalates, cycloalkyl phthalates, benzyl and aryl phthalates, alkoxy phthalates, alkyl/aryl phosphates, polyglycol esters, adipate esters, citrate esters, esters of glycerin, fatty acids, salts or esters of saturated or unsaturated fatty acids, and combinations thereof.

In embodiments that include impact modifiers, preferred concentrations of the impact modifiers in the support material range from about 1% to about 40% by weight. Suitable impact modifiers preferably increase the toughness of the support material, thereby increasing the strength of the support material feedstock and the resulting support structure. Suitable impact modifiers for use with the primary copolymer include, but are not limited to, a variety of different polymeric materials, such as epoxy-functional polyolefins (e.g., polyethylenes and polypropylenes). Suitable epoxy-functional polyethylenes include copolymers of ethylene monomer units and epoxy monomer units that include epoxy-terminated carboxylate ester groups.

Preferred impact modifiers include copolymers of ethylene, and glycidyl methacrylate, and optionally one or more alkyl (meth)acrylates such as butyl acrylate. However, in some embodiments, the impact modifier includes less than 5% by weight of alkyl (meth)acrylates, and in further embodiments is substantially free of, or completely free of, alkyl (meth)acrylates (e.g., butyl acrylate).

In the embodiments including the above-discussed additional additives, the thermoplastic copolymer preferably constitutes the remainder of the support material. As such, the thermoplastic copolymer may constitute from about 55% to 100% by weight of the support material, and more preferably from about 75% to 100% by weight. In some embodiments, the thermoplastic copolymer constitutes from about 90% to 100% by weight of the support material, more preferably from about 95% to 100% by weight. In further embodiments, the support material consists essentially of the thermoplastic copolymer, and optionally, one or more antioxidants and/or impact modifiers.

In further embodiments, the neutralized thermoplastic copolymer can also be blended (e.g., compounded) with various concentrations of thermoplastic copolymers in the pre-neutralized form, which have lower glass transition temperatures than the neutralized thermoplastic copolymer. Preferably, the neutralized thermoplastic copolymer and the pre-neutralized thermoplastic copolymer are substantially miscible with each other to substantially maintain a single overall glass transition temperature to match with the paired part material. For example, a neutralized thermoplastic copolymer having a high glass transition temperature can be blended with the different concentrations of the same pre-neutralized thermoplastic copolymer (having a lower glass transition temperature) to produce a wide range of blends with different glass transition temperatures. This can reduce production costs for manufacturing support materials for pairing with different part materials.

Figure 4D:
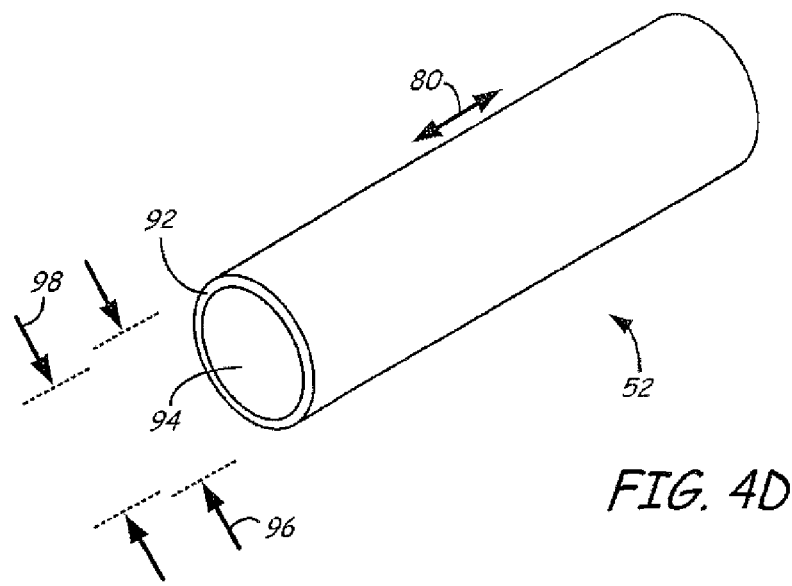
FIG. 4D is a perspective view of a segment of a cylindrical core-shell filament of the support material.

The resulting support material may then be formed into a desired media for use with an additive manufacturing system. For example, the support material may be melt processed and extruded to produce filament 52 for use in system 10. FIGS. 4A-4E illustrate example embodiments for filament 52 produced with the support material of the present disclosure. As shown in FIG. 4A, filament 52 may have a cylindrical or substantially cylindrical geometry, such as those disclosed in Crump, U.S. Pat. No. 5,121,329; Crump et al., U.S. Pat. No. 5,503,785; and Comb et al., U.S. Pat. No. 7,122,246. For example, filament 52 may have a longitudinal length 80 and an average diameter (referred to as diameter 82) along longitudinal length 80. As used herein, the term "average diameter" of a filament (e.g., diameter 82) is an average based on a 100-foot segment length of the filament. Diameter 82 may be any suitable dimension that allows filament 52 to be received by a print head of an additive manufacturing system (e.g., print head 18).

Alternatively, as shown in FIG. 4B, filament 52 may have a non-cylindrical geometry, such as a ribbon filament as disclosed in Batchelder et al., U.S. Pat. No. 8,221,669. It is understood that "ribbon filament" may have a rectangular cross-sectional geometry with right-angle corners and/or with rounded corners. In these embodiments, suitable liquefier assemblies for liquefier assemblies 44 and 46 (shown in FIG. 2) include those disclosed in Batchelder et al., U.S. Application Publication No. 2011/0074065; and in Swanson et al., U.S. Application Publication No. 2012/0070523.

Furthermore, as shown in FIG. 4C, filament 52 may alternatively have a hollow geometry. In this embodiment, filament 52 may have a longitudinal length 80, an average outer diameter (referred to as outer diameter 88) along longitudinal length 80, and an average inner diameter (referred to as inner diameter 90) along longitudinal length 80.

Figure 4E:
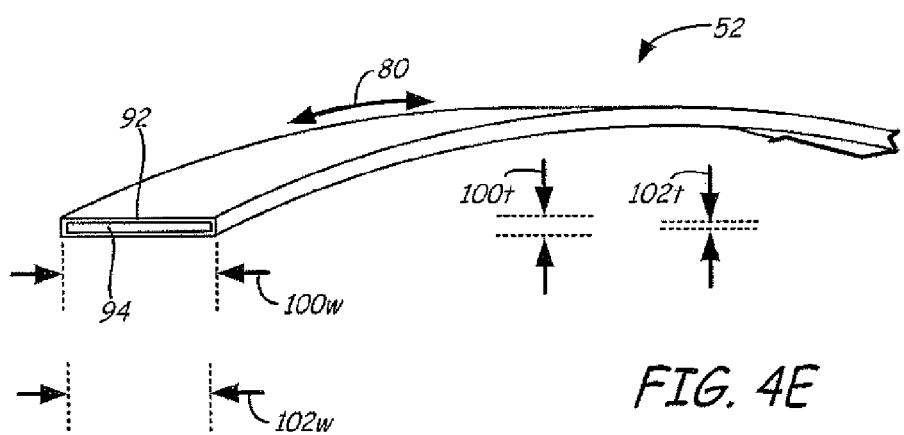
FIG. 4E is a perspective view of a segment of a ribbon core-shell filament of the support material.

Additionally, as shown in FIGS. 4D and 4E, filament 52 may alternatively have a core-shell geometry, as mentioned above, where the support material may be used to form either the core or the shell. For instance, the support material of this embodiment may function as a soluble shell in combination with a bulk core of a second polymer material, such as a second soluble support material having a lower mechanical strength and modulus, but that has a higher disintegration rate in the aqueous solution. Alternatively, the support material may function as a soluble core in combination with a second soluble support material that exhibits exceptional adhesiveness to an associated part material.

In either the cylindrical embodiment shown in FIG. 4D or the ribbon embodiment shown in FIG. 4E, filament 52 may have a longitudinal length 80, a shell portion 92, and a core portion 94, where the shell portion 92 and core portion 94 each preferably extend along longitudinal length 80. In further alternative embodiments, filament 52 may three or more cross-sectional portions (e.g., a core portion and two or more shell portions).

Alternatively, in the ribbon embodiment shown in FIG. 4E, which is a combination of the embodiments shown above in FIGS. 4B and 4D, shell portion 92 may have an average outer width (referred to as outer width 100$w$) and an average inner width (referred to as inner width 102$w$) along longitudinal length 80, where inner width 102$w$ corresponds to an outer width of core portion 94. Similarly, shell portion 92 may have an average outer thickness (referred to as outer thickness 100$t$) and an average inner thickness (referred to as inner thickness 102$t$) along longitudinal length 80, where inner thickness 102$t$ corresponds to an outer thickness of core portion 94. Examples of suitable core-shell geometries for this embodiment (e.g., widths 100$w$ and 102$w$, and thicknesses 100$t$ and 102$t$) include those discussed in Mikulak et al., U.S. Publication Nos. 2012/0070619 and 2012/0231225, and those discussed above for the ribbon filament 52 in FIG. 4B.

Consumable assembly 24 may include any suitable length of filament 52 as illustrated in FIGS. 4A-4E. Thus, longitudinal length 80 for filament 52 in the embodiments shown in FIGS. 4A-4E is preferably about 100 feet or more. In additional embodiments, filament 52 (e.g., as shown in FIGS. 4A-4E) may include topographical surfaces patterns (e.g., tracks) as disclosed in Batchelder et al., U.S. Pat. No. 8,236,227; and/or may include encoded markings as disclosed in Batchelder et al., U.S. Pat. No. 8,658,250.

Figure 5A:
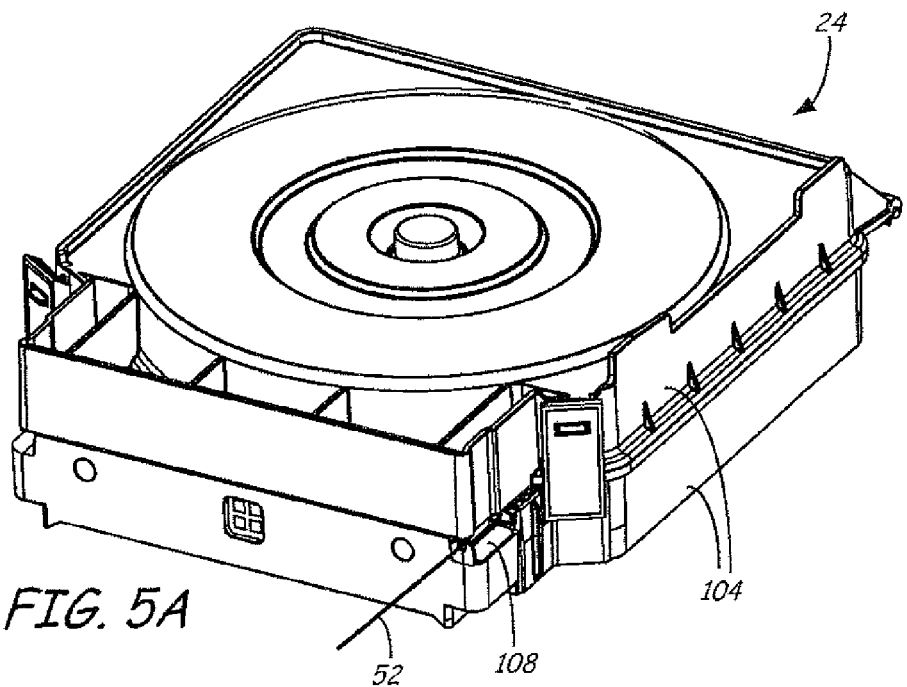
FIG. 5A is a perspective view of a first embodied consumable assembly for retaining a supply of the support material in filament form.
Figure 5B:
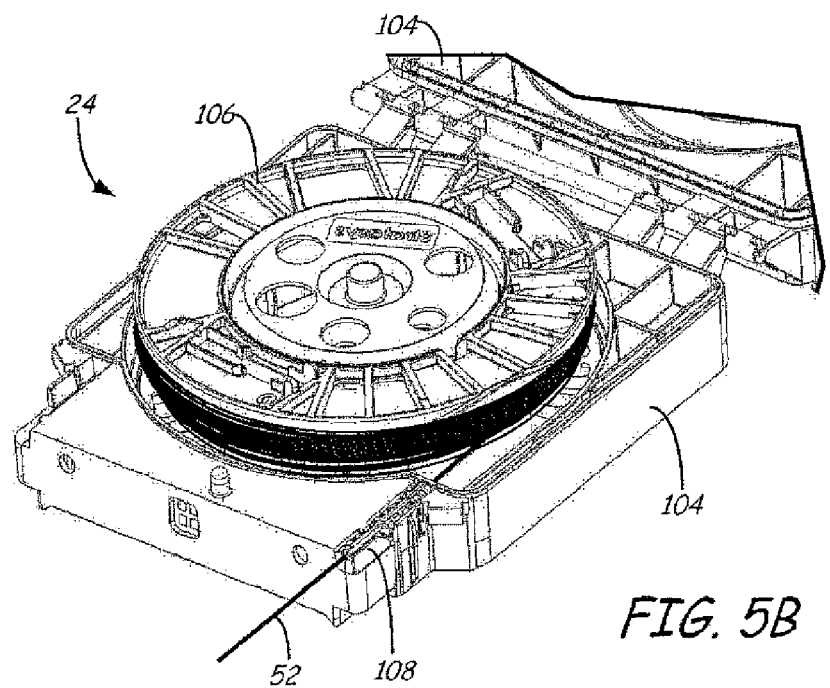
FIG. 5B is a perspective view of the first embodied consumable assembly in an open state, illustrating an interior of the first embodied consumable assembly.

FIGS. 5A-6C illustrate examples of suitable consumable assemblies for consumable assembly 24, which may retain a supply of filament 52 of the support material. For example, FIGS. 5A and 5B illustrates consumable assembly 24 with a container portion 104, spool 106, and guide mechanism 108, where container portion 104 is configured to open and close in a sealing manner as shown to retain spool 106 and guide mechanism 108. Spool 106 accordingly retains a supply of filament 52 of the support material, and relays filament 52 out of consumable assembly 24 via guide mechanism 108.

Figure 6A:
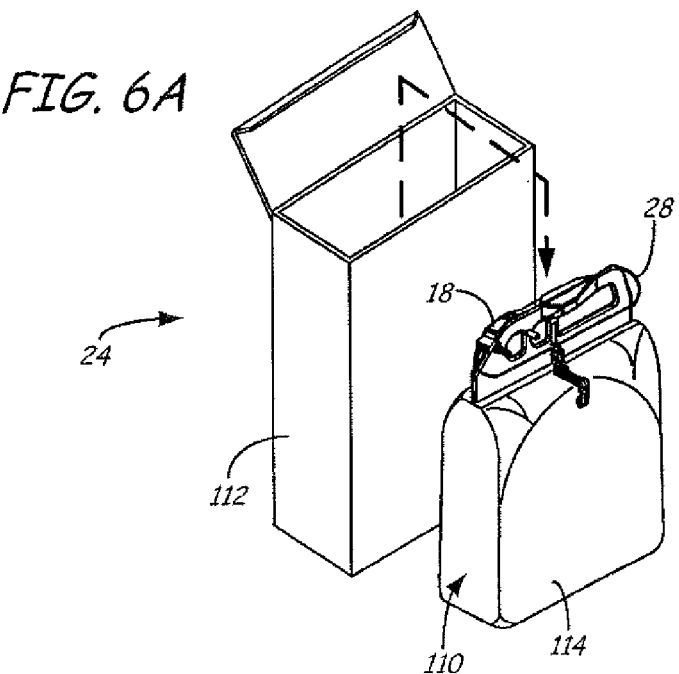
FIG. 6A is a perspective view of a second embodied consumable assembly for retaining a supply of the support material in filament form.
Figure 6B:
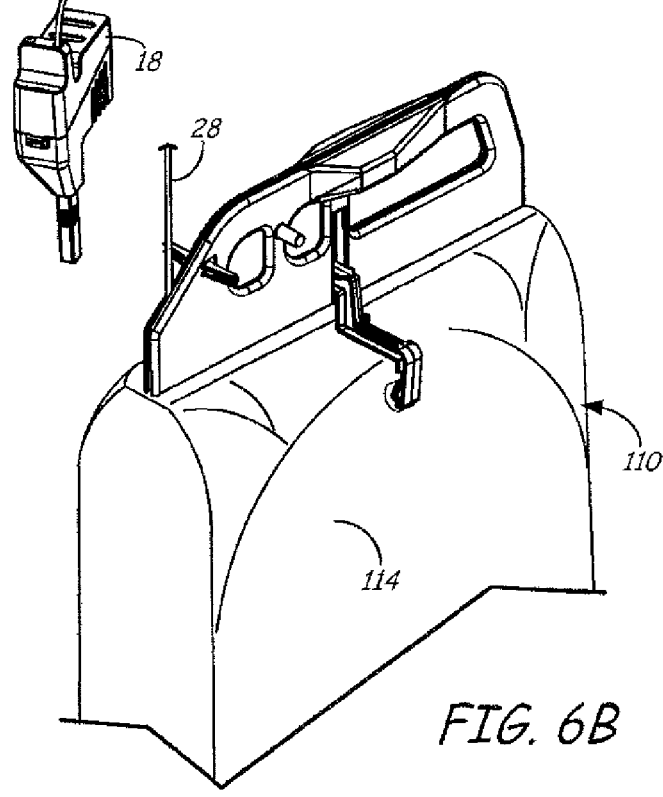
FIG. 6B is an expanded perspective view of the second embodied consumable assembly, illustrating an integrated print head and guide tube.
Figure 6C:
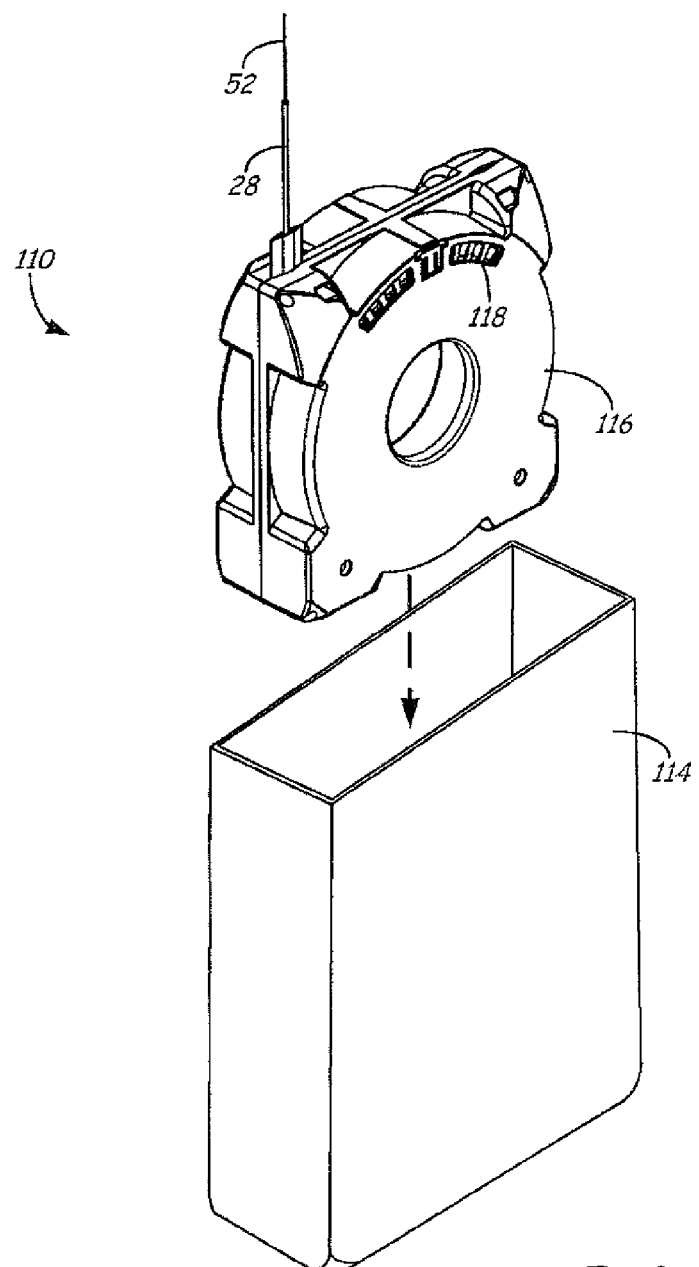
FIG. 6C is a perspective view of a container portion of the second embodied consumable assembly.

FIGS. 6A-6C illustrate an alternative embodiment for print head 18, consumable assembly 24, and guide tube 28, which are combined into a single, removable assembly, such as disclosed in Mannella et al., U.S. Publication Nos.

2013/0161439 and 2013/0161442. As shown in FIG. 6A, in this embodiment, consumable assembly 24 preferably includes container portion 110, which may be retained in a storage box 112, and is configured to mount print head 18 and guide tube 28.

As shown in FIG. 6B, print head 18 and guide tube 28 may be unmounted from container portion 110 and loaded to system 10 such that print head 18 is moveably retained by gantry 20, such as disclosed in Swanson, U.S. Publication Nos. 2010/0283172 and 2012/0164256. As shown in FIG. 6C, container portion 110 may include liner 114, rigid module 116, and spool 118, where spool 118 is rotatably mounted within rigid module 116 and retains a supply of filament 52 of the support material. Rigid module 116 may also be secured within liner 114, which is preferably a moisture and/or gas-barrier liner.

In each of the above-discussed embodiments for consumable assembly 24 (e.g., as shown in FIGS. 5A-6C), the retained supply of filament 52 of the support material is preferably maintained in a dry state, as mentioned above. As such, consumable assembly 24 may be pre-dried and sealed to prevent moisture absorption. Additionally, consumable assembly 24 may include one or more desiccant packs to maintain a dry environment during transportation, storage, and use. In alternative embodiments, the support material may be unsealed and exposed to atmospheric conditions during storage, transportation, and use with system 10.

In each of the above-discussed embodiments for consumable assembly 24 (e.g., as shown in FIGS. 5A-6C), the retained supply of filament 52 of the support material is preferably maintained in a dry state, as mentioned above. As such, consumable assembly 24 may be pre-dried and sealed to prevent moisture absorption. Additionally, consumable assembly 24 may include one or more desiccant packs to maintain a dry environment during transportation, storage, and use. In alternative embodiments, the support material may be unsealed and exposed to atmospheric conditions during storage, transportation, and use with system 10.

Powder-Based Additive Manufacturing

In addition to the above-discussed extrusion-based additive manufacturing system, which preferably provides the support material in filament form (e.g., filament 52), the support material may alternatively be provided to an extrusion-based additive manufacturing system in powder form for use in an auger-pump print head, such as disclosed in Bosveld et al., U.S. Publication No. 2013/0333798.

In this embodiment, the support material is preferably pelletized or otherwise micronized and/or classified to attain desired powder particle sizes for use in the auger-pump print head. Examples of suitable average particles sizes for the support material powder range from about 15 micrometers to about 125 micrometers, and in some embodiments from about 20 micrometers to about 50 micrometers.

Moreover, the support material may be provided in powder form for use in other powder-powder-based additive manufacturing systems, such as selective laser sintering systems (e.g., systems disclosed in Deckard, U.S. Pat. Nos. 4,863,538 and 5,132,143), powder/binder systems (e.g., systems disclosed in Sachs et al., U.S. Pat. No. 5,204,055), sand casting systems, electron-beam systems, and the like. Additional systems for the embodiment include those disclosed in Mannella et al., U.S. Pat. No. 8,221,858. In these embodiments, the support material is also preferably pelletized or otherwise micronized and/or classified to attain desired powder particle sizes for use in the particular system.

Electrophotography-Based Additive Manufacturing

In another embodiment, the support material is configured for use in an electrophotography-based additive manufacturing system to print support structures, in association with a part material used to print 3D parts, with high resolutions and fast printing rates. Examples of suitable electrophotography-based additive manufacturing systems for this embodiment include those disclosed in Hanson et al., U.S. Publication Nos. 2013/0077996 and 2013/0077997, and Comb et al., U.S. Publication Nos. 2013/0186549 and 2013/0186558.

In electrophotography-based methods, during a printing operation, EP engines may develop or otherwise image each layer of the part and support materials using the electrophotographic process. The developed layers are then transferred via a transfer assembly to a layer transfusion assembly where they are transfused (e.g., using heat and/or pressure) to print one or more 3D parts and support structures in a layer-by-layer manner. Accordingly, the support material of the present disclosure is preferably thermally stable while being transfused at a layer transfusion assembly.

As mentioned above, the support material is engineered for use in an electrophotography-based additive manufacturing system to print support structures. As such, the support material may also include one or more materials to assist in developing layers with EP engine, to assist in transferring the developed layers from EP engine to layer transfusion assembly, and to assist in transfusing the developed layers with a layer transfusion assembly.

For embodiments in EP based methods, the support material preferably includes one or more charge control agents, which may be added to the polymer during the manufacturing process of the support material. For example, the charge control agent may be melt blended with the polymer, prior to subjecting the blended materials to grinding, micronization, and/or classification.

The charge control agents preferably constitute from about 0.1% by weight to about 5% by weight of the support material, more preferably from about 0.5% by weight to about 2% by weight, and even more preferably from about 0.75% by weight to about 1.5% by weight, based on the entire weight of the support material. As discussed above, these charge control agents preferably increase the charging rate of the polymer against the carrier, and stabilize the Q/M ratio over extended continuous periods of printing operations with system.

In addition to incorporating the charge control agents, for efficient operation of the EP engine, and to ensure fast and efficient triboelectric charging during replenishment of the support material, the mixture of the support material preferably exhibits good powder flow properties.

As can be appreciated, blockage or flow restrictions of the support material during the replenishment feeding can inhibit the supply of the support material to the carrier particles. Similarly, portions of the support material should not become stuck in hidden cavities in the development station.

For example, the support material may constitute from about 1% by weight to about 30% by weight, based on a combined weight of the support material and the carrier particles, more preferably from about 5% to about 20%, and even more preferably from about 5% to about 10%. The carrier particles accordingly constitute the remainder of the combined weight.

The powder flow properties of the support material can be improved or otherwise modified with the use of one or more flow control agents, such as inorganic oxides. Examples of suitable inorganic oxides include hydrophobic fumed inorganic oxides, such as fumed silica, fumed titania, fumed alumina, mixtures thereof, and the like, where the fumed oxides may be rendered hydrophobic by silane and/or siloxane-treatment processes. Examples of commercially available inorganic oxides for use in the support material include those under the tradename "AEROSIL" from Evonik Industries AG, Essen, Germany.

The flow control agents (e.g., inorganic oxides) preferably constitute from about 0.1% by weight to about 10% by weight of the support material, more preferably from about 0.2% by weight to about 5% by weight, and even more preferably from about 0.3% by weight to about 1.5% by weight, based on the entire weight of the support material. The flow control agents may be introduced to the polymer and charge control agent at any suitable point in the manufacturing process to produce the support material. For example, the blended polymer may be further dry blended in a high speed and high shear cyclonic mixing apparatus, preferably at 25° C., with one or more external flow control agents. This uniformly distributes, coats, and partially embeds the flow control agent(s) into the individual particles of the blended polymer, without significantly altering the particle size or particle size distribution.

As discussed above, the one or more charge control agents are suitable for charging the support material copolymer to a desired Q/M ratio for developing layers of the support material at the EP engine, and for transferring the developed layers to a layer transfusion assembly. However, the multiple printed layers in a 3D environment effectively prevents the electrostatic transfer of support material after a given number of layers are printed. Instead, layer transfusion assembly utilizes heat and pressure to transfuse the developed layers together in the transfusion steps.

Accordingly, the support material may also include one or more heat absorbers configured to increase the rate at which the support material is heated when exposed to heaters of layer transfusion assembly. For example, in embodiments in which the heaters are infrared heaters, the heat absorber(s) used in the support material may be one or more infrared (including near-infrared) wavelength absorbing materials. Absorption of infrared light causes radiationless decay of energy to occur within the particles, which generates heat in the support material.

In embodiments that incorporate heat absorbers, the heat absorbers (e.g., infrared absorbers) preferably constitute from about 0.5% by weight to about 10% by weight of the support material, more preferably from about 1% by weight to about 5% by weight, and in some more preferred embodiments, from about 2% by weight to about 3% by weight, based on the entire weight of the support material. The heat absorber may be introduced to the polymer at any suitable point in the manufacturing process to produce the support material, such as with the charge control agent. For example, the charge control agent and the heat absorber may be melt blended with the thermoplastic copolymer, prior to subjecting the blended materials to grinding, micronization, and/or classification.

For use in electrophotography-based additive manufacturing systems (e.g., system 130), the support material has powder form with a controlled average particle size and a narrow particle size distribution, which are preferably similar to or substantially the same as those of the part material. The D50 particle sizes for the support material are preferably within about 15 micrometers of the D50 particle size of the part material, more preferably within about 10 micrometers, and even more preferably within about 5 micrometers, where the particle sizes and particle size distributions are determined pursuant to the Particle Size and Particle Size Distribution standard described below. For example, preferred D50 particles sizes for the support material include those up to about 100 micrometers if desired, more preferably from about 10 micrometers to about 30 micrometers, more preferably from about 10 micrometers to about 20 micrometers, and even more preferably from about 10 micrometers to about 15 micrometers.

Additionally, the particle size distributions for the support material, as specified by the parameters D90/D50 particle size distributions and D50/D10 particle size distributions, each preferably range from about 1.00 to 1.40, more preferably from about 1.10 and to about 1.35, and even more preferably from about 1.15 to about 1.25. Moreover, the particle size distribution for the support material is preferably set such that the geometric standard deviation $\sigma_g$ preferably meets the criteria pursuant to the following Equation 1:

$$\sigma g = \frac{D90}{D50} \sim \frac{D50}{D10}$$

In other words, the D90/D50 particle size distributions and D50/D10 particle size distributions are preferably the same value or close to the same value, such as within about 10% of each other, and more preferably within about 5% of each other.

The support material may be manufactured by polymerizing or otherwise providing the thermoplastic copolymer, melt blending the thermoplastic copolymer with the charge control agent, basic substance and optionally with the heat absorber and/or any additional additives, and then grinding, micronizing and/or classifying the resulting material to attain a powder having the above-discussed particle sizes and particle size distributions. Some additional materials, such as the flow control agent, may be blended to the resulting powder under high shear, if desired. This uniformly distributes, coats, and partially embeds the flow control agent(s) into the individual particles of the support material, without significantly altering the particle size or particle size distribution.

The formulated support material may then be filled into a cartridge or other suitable container for use with an EP engine, which may be retained in the development station.

The carrier particles in the development station may be any suitable magnetizable carrier particles for charging the support material, such as carrier particles having strontium ferrite cores with polymer coatings. The cores are typically larger in size than the particles of the support material, such as averaging from about 20 micrometers to about 25 micrometers in diameter. The polymer coatings may vary depending on the Q/M ratios desired for the support material. Examples of suitable polymer coatings include poly (methyl methacrylate) (PMMA) for negative charging, or poly(vinylidene fluoride) (PVDF) for positive charging. Suitable weight ratios of the support material to the carrier particles in the development station or cartridge include those discussed above.

Support Structure Removal

After the printing operation is completed with any of the above-discussed additive manufacturing systems, the resulting 3D part and support structure may be removed from the system and undergo one or more post-printing operations. For example, the support structure derived from the support material of the present disclosure may be sacrificially removed from the 3D part, such as by using an aqueous-based alkaline solution or dispersion. Under this preferred soluble technique, the support structure may at least partially disintegrate in the aqueous alkaline solution or dispersion, separating it from the 3D part in a hands-free manner.

In comparison, the part material is typically chemically resistant to aqueous solutions, particularly aqueous alkali solutions or dispersions. This allows the use of an alkaline aqueous solution or dispersion to be employed for removing the sacrificial support structure without degrading the shape or quality of the 3D part. Examples of suitable systems and techniques for removing support structure in this manner include those disclosed in Swanson et al., U.S. Pat. No. 8,459,280; Hopkins et al., U.S. Pat. No. 8,246,888; and Dunn et al., U.S. Publication No. 2011/0186081.

In some preferred embodiments, the disintegrated support structure may also be collected from the aqueous solution and recycled or otherwise discarded in an environmentally-friendly manner More preferably, the support material (or any derivative thereof after being subjected to the aqueous solution) is separated from the aqueous solution, collected, and reformulated as fresh support material for subsequent printing operations.

Property Analysis and Characterization Procedures

Various properties and characteristics of the part and support materials described herein may be evaluated by various testing procedures as described below:
1. Glass Transition Temperature and Melt Processing Temperature The glass transition temperature is determined using the classical ASTM method employing Differential Scanning calorimetry (DSC) ASTM D3418-12e1 and is reported in degrees Celsius. The test is performed with a DSC analyzer commercially available under the tradename "DSC 6000" from PerkinElmer, Waltham, Mass. under nitrogen at a heating rate of 10° C./min.

The melt processing temperature is determined by using a capillary rheometer commercially available under the tradename "CFT-500D" Flowtester Capillary Rheometer from Shimadzu Corporation, Tokyo, Japan. The test was performed under a 10-kilogram load with a one millimeter die, and at a heating rate of 5° C./min.
2. Disintegration Rate The disintegration rate, for measuring the solubility of a support material copolymer, is determined by initially hot pressing four pellets (0.625-inch diameter and 0.05-inch thickness) at 350° F. and under a 2,000-pound load. The pressed pellets are then vacuum dried at 90° C. for four hours, and each pellet is weighed on an analytical balance. An aqueous solution is then prepared by filling a container with one kilogram of a pH 13 alkali solution commercially available under the tradename "WATERWORKS" from Stratasys, Inc., Eden Prairie, Minn., and stirring with a magnetic stirrer at 70° C.

Each pellet is then pre-weighed and then placed in the aqueous solution for 3 minutes, 6 minutes, 10 minutes, and 15 minutes (respectively for the four pellets). After each pellet is removed, it is vacuum dried at 90° C. for four hours and weight on an analytical balance to calculate the weight loss for the pellet. The calculated weight loss for each pellet is then plotted against its disintegrating time in aqueous solution. A linear relationship is then formed for the copolymer, and the slope is determined to be the disintegration rate in the units of percent weight loss per minute (−wt %/min)
3. Thermal Stability The thermal stability of a support material copolymer or a thermoplastic copolymer is measured by thermal gravimetric analysis (TGA) with a TGA system commercially available under the tradename "Q500" from TA Instruments, New Castle, Del., under nitrogen, and at a heating rate of 10° C./min. The thermal stability of the support material may be referenced by a weight percentage of thermal degradation over a given exposure duration.

For example, the thermal stability of a given thermoplastic copolymer may be characterized such that less than 10% by weight of the thermoplastic copolymer thermally degrades when the thermoplastic copolymer is exposed to a given melt processing temperature (e.g., 250° C.) for a 10-second duration. Other weight percents may also be referenced, such as less than 5% by weight, less than 1% by weight, and less than 0.5% by weight, and the like; and any suitable duration may be referenced, such as 5 seconds, 10 seconds, 30 seconds, 1 minute, 5 minutes, 10 minutes, 30 minutes, and the like. Combinations of these weight percent and duration references may also be used.
4. Particle Size and Particle Size Distribution Particle sizes and particle size distributions for the electrophotography-based powders are measured using a particle size analyzer commercially available under the tradename "COULTER MULTISIZER II ANALYZER" from Beckman Coulter, Inc., Brea, Calif.

EXAMPLES

The present disclosure is more particularly described in the following examples that are intended as illustrations only, since numerous modifications and variations within the scope of the present disclosure will be apparent to those skilled in the art.

Example 1

The support material copolymer of Run 1 as indicated in Table 1 and Table 2 below was a comparative example material that included a non-neutralized copolymer derived from 30% by weight styrene, 30% by weight butyl acrylate, and 40% by weight methacrylic acid. The polymerization process was conducted in an ethanol/toluene solvent with a nitroxide-based, free-radical initiator commercially available under the tradename "BLOCBUILDER MA" from Arkema, Inc., PA. The polymerization was carried out at 110° C. under nitrogen for 8 hours, and the resulting copolymer was recovered via a twin screw extruder and an underwater pelletizer.

Support material copolymers for Runs 2, 3, and 4 were neutralized copolymers of the support material copolymer of Run 1 with lithium hydroxide (LiOH), which neutralized 10%, 25%, and 50% of the carboxylic acid groups, respectively. Each neutralization was conducted by dissolving the copolymer in a solvent mixture of ethanol and tetrahydrofuran having a weight ratio of 80/20 by weight percent, respectively, followed by the adding calculated amounts of the LiOH aqueous solutions. Each mixture was stirred at room temperature for one hour, and the resulting neutralized copolymer was recovered by rotary evaporating the solvent at 65° C.-80° C. under a pressure of 40 millibars, followed by vacuum drying at 120° C. for three days, and then at 230° C. for 30 minutes.

Example 2

The support material copolymers of Run 5 and 6 (Table 1 and Table 2) were neutralized copolymers of the support material copolymer of Run 1 with potassium hydroxide (KOH), which neutralized between 25% and 50% of the carboxylic acid groups, respectively. Each neutralization was conducted by dissolving the copolymer in a solvent mixture of ethanol and tetrahydrofuran having a weight ratio of 80/20 by weight percent, followed by the adding calculated amounts of the KOH aqueous solutions. Each mixture was stirred at room temperature for one hour, and the resulting neutralized copolymer was recovered by rotary evaporating the solvent at 65° C.-80° C. under 40 millibars, followed by vacuum drying at 120° C. for three days, and then at 230° C. for 30 minutes.

Example 3

The support material copolymer of Run 7 (Table 1 and Table 2) included a copolymer derived from 25% by weight styrene, 25% by weight acrylic acid, and 50% by weight methacrylic acid. The polymerization process was conducted in an ethanol solvent with a dibenzoyl peroxide free-radical initiator. The polymerization was carried out at 80° C. under nitrogen for 8 hours, and then a potassium hydroxide (KOH) aqueous solution calculated to neutralize 19% of the carboxylic acid groups was added. The mixture was stirred at room temperature for 30 minutes, and the resulting neutralized copolymer was recovered by rotary evaporating the solvent at 65° C.-80° C. under 40 millibars, followed by vacuum drying at 120° C. for three days, and then at 230° C. for 30 minutes.

Example 4

The support material copolymer of Run 8 (Table 1 and Table 2) included a copolymer derived from 50% by weight styrene and 50% by weight methacrylic acid. The polymerization process was conducted in an ethanol solvent with a dibenzoyl peroxide free-radical initiator. The polymerization was carried out at 80° C. under nitrogen for 8 hours, and then a potassium hydroxide (KOH) aqueous solution calculated to neutralize 19% of the carboxylic acid groups was added. The mixture was stirred at room temperature for 30 minutes, and the resulting neutralized copolymer was recovered by rotary evaporating the solvent at 65° C.-80° C. under a pressure of 40 millibars, followed by vacuum drying at 120° C. for three days, and then at 230° C. for 30 minutes.

Table 1 lists the monomer concentrations and percent neutralization by the lithium hydroxide and potassium hydroxide aqueous solutions for the support material copolymers described in Examples 1-4 (Runs 1-8):

TABLE 1

| Runs | Styrene (% by weight) | Butyl Acrylate (% by weight) | Acrylic Acid (% by weight) | Methacrylic Acid (% by weight) | % LiOH | % KOH |
|---|---|---|---|---|---|---|
| Run 1 | 30 | 30 | 0 | 40 | 0 | 0 |
| Run 2 | 30 | 30 | 0 | 40 | 10 | 0 |
| Run 3 | 30 | 30 | 0 | 40 | 25 | 0 |
| Run 4 | 30 | 30 | 0 | 40 | 50 | 0 |
| Run 5 | 30 | 30 | 0 | 40 | 0 | 25 |
| Run 6 | 30 | 30 | 0 | 40 | 0 | 50 |
| Run 7 | 25 | 0 | 25 | 50 | 0 | 19 |
| Run 8 | 50 | 0 | 0 | 50 | 0 | 19 |

The support material copolymers of Runs 1-8 were then tested for glass transition temperatures, melt temperatures, and disintegration rates, which are shown below in Table 2:

TABLE 2

| Runs | % LiOH | % KOH | Glass Transition Temperature (° C.) | Melting Temperature (° C.) |
|---|---|---|---|---|
| Run 1 | 0 | 0 | 113 | 197 |
| Run 2 | 10 | 0 | 134 | 240 |
| Run 3 | 25 | 0 | 154 | ** |
| Run 4 | 50 | 0 | 238 | ** |
| Run 5 | 0 | 25 | 173 | 279 |
| Run 6 | 0 | 50 | 236 | 318 |
| Run 7 | 0 | 19 | 211 | 289 |
| Run 8 | 0 | 19 | 197 | 288 |

(**) Melting temperature testing was unsuccessful due to copolymer foaming

The results in Table 2 show that the glass transition temperatures of the neutralized copolymers increased substantially linearly by increasing the percent of neutralization by lithium hydroxide or potassium hydroxide. This indicated that high-temperature, soluble copolymers with desirable glass transition temperatures could be obtained by adjusting percent of neutralization for the copolymers with an alkali metal cation.

Figure 7:
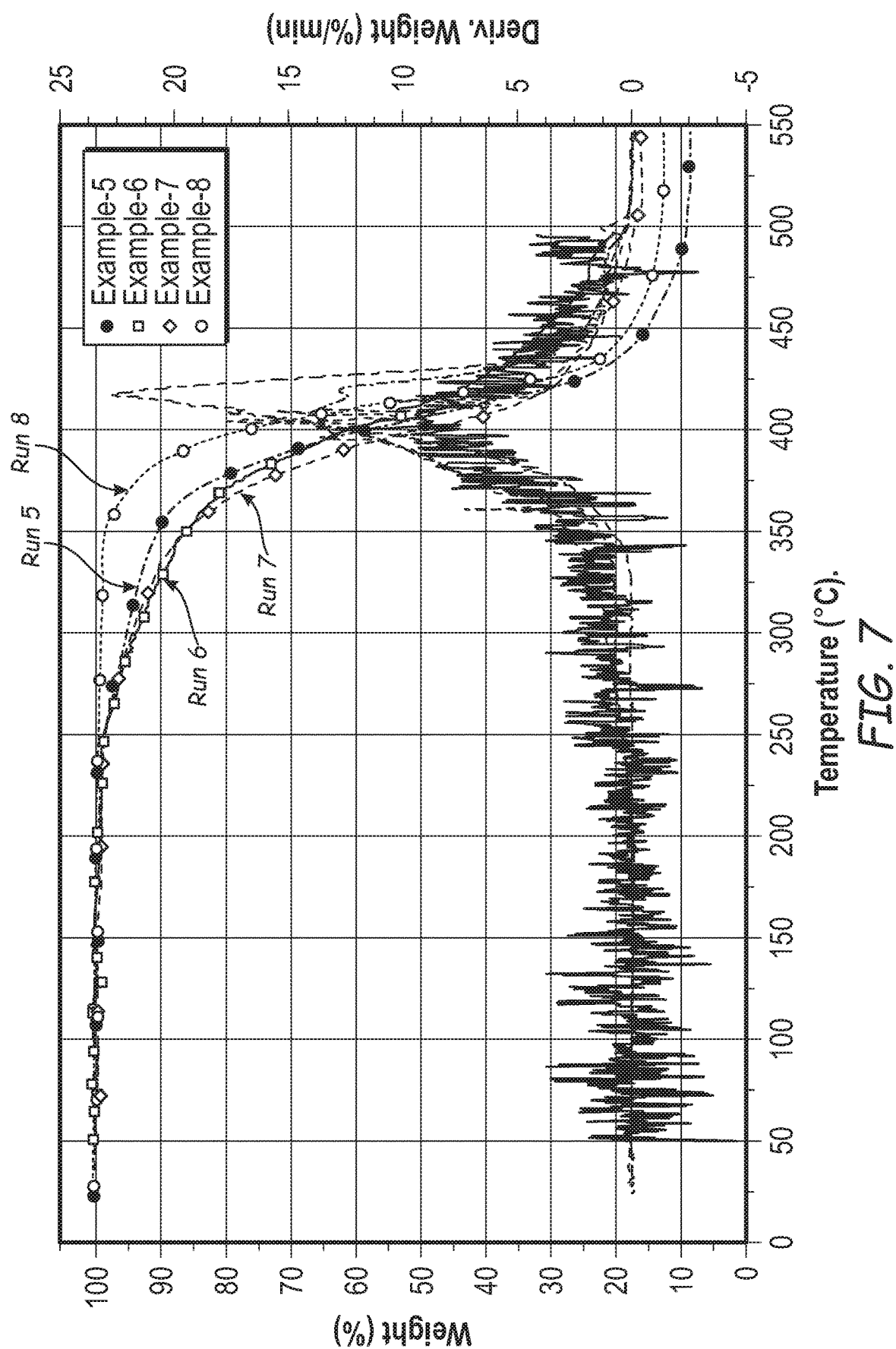
FIG. 7 is a graphical illustration of TGA plots for tested support material copolymers for determining the thermal stabilities of the copolymers.

FIG. 7 shows TGA plots for the copolymers of Runs 5-8, as tested pursuant to the Thermal Stability Test. It was noted that the copolymers of Runs 5-7 started to show weight loss at temperatures around 250° C. This indicated they began to thermally degrade prior to reaching their melt processing temperatures (shown above in Table 2). It was also noted that the copolymer of Run 9, as discussed below, did not show any weight loss until temperatures reached about 350° C. This indicated that this copolymer was thermally stable at temperatures above its melt processing temperature, and is suitable for use in combination with high-performance part materials, such as polyetherimides and/or polyphenylsulfones.

Example 5

This example demonstrates producing a high glass transition ($T_g$) ionomer resin using reactive extrusion. The pre-neutralized polymer was of approximately 100,000 dalton molecular weight and a composition of nominally 37% styrene, 23% butyl acrylate, and 40% methacrylic acid by mass, determined by proton nuclear magnetic resonance ($^1$H NMR). Potassium hydroxide (KOH) was used in solid form as the basic reagent for neutralization. Melt processing within a co-rotating, twin screw extruder (American Leistritz Extruder Company, Micro-27 TSE) was used to partially neutralize the methacrylic acid polymer and form an ionomer of the potassium salt. The polymer and base were placed into separate gravimetric feeders (K-Tron K-2) and calibrated so that the entire mass feed rate was held to 10 pounds per hour while adjustments to the base concentration were made at concentrations of zero, 1, 3, 5, and 7 percent by mass. Both materials were fed into the throat of the extruder. The extruder was operated at a fixed set point temperature of 230° C. across all zones of the extruder, and the screws were rotated at 350 rpm. An atmospheric vent section was used to liberate water that formed as a result of the reaction. The partially neutralized polymer extrudate was formed into strands through a die with 3 mm holes at the exit of the extruder. The extruded strands were cooled by air on a conveying belt, and pelletized. The collected pellets of material were processed through the extruder an additional two times under identical process conditions to assure the complete consumption of the base. The resulting $T_g$ of the partially neutralized polymer varied by the concentration of the of based added into the initial processing step. The higher the base concentration, the greater was the increase in Tg.

Differential scanning calorimetry (DSC) was used to determine the Tg of the partially neutralized polymer compositions. The DSC program followed a temperature from 38° C. to 230° C. at a rate of 10° C./min and then to maintain the temperature at 230° C. for three minutes. The temperature was then reduced from 230° C. to 30° C. at a rate of 50° C./min and held at 30° C. for three minutes. The temperature was then raised from 30° C. to 250° C. at a rate of 10° C./min. The temperature was maintained at 230° C. for three minutes and then decreased to 30° C. at a rate of 50° C./min $T_g$ was determined in the second heat ramp. Table 3 shows the effect on $T_g$ by the increased base concentrations of KOH. The partially neutralized polymer compositions were verified to be disintegrable in commercially available soluble support removal baths at 70° C. (EcoWorks™ and WaterWorks™, Stratasys).

TABLE 3

| Percent KOH (wt %) | $T_g$ (° C.) |
| --- | --- |
| 0 | 112.7 |
| 1 | 128.5 |
| 3 | 146.5 |
| 5 | 161.3 |
| 7 | 175.2 |

Example 6

Following the procedures described in Example 5 and using the identical pre-neutralized polymer, reactive extrusion by melt processing was performed to produce a partially neutralized, ionomer polymer of a potassium salt by switching the basic reagent from potassium hydroxide to potassium bicarbonate. Similar process conditions and evaluation methods were used. Table 4 lists the resulting Tg values of these materials at various concentrations of potassium bicarbonate. As shown by the results, potassium bicarbonate is an effective base to produce the support material with the desired Tg. The partially neutralized polymer compositions were verified to be disintegrable in commercially available soluble support removal baths at 70° C. (EcoWorks™ and WaterWorks™, Stratasys).

TABLE 4

| Percent Potassium Bicarbonate (wt %) | $T_g$ (° C.) |
| --- | --- |
| 0 | 112.7 |
| 5.4 | 153.9 |
| 8.9 | 173.0 |
| 12.5 | 196.8 |

Although the present disclosure has been described with reference to preferred embodiments, workers skilled in the art will recognize that changes may be made in form and detail without departing from the spirit and scope of the disclosure.

The invention claimed is:

1. A method for printing a three-dimensional part with an additive manufacturing system, the method comprising:
printing the three-dimensional part with a part material with a glass transition temperature greater than 160° C., and a support structure with a support material wherein the glass transition temperature of the support material is higher than about 150° C. and within about 10° C. of the glass transition temperature of the part material, the melt processing temperature is greater than about 220° C. and wherein the support material comprises a thermoplastic copolymer comprising carboxylic acid groups wherein a portion of the carboxylic acid groups are neutralized to form carboxylic acid salt groups wherein the amount of carboxylic acid salt groups in the thermoplastic copolymer of the support material is controlled to control the glass transition temperature of the support material.

2. The method of claim 1, further comprising disintegrating at least a portion of the support structure in an alkaline aqueous solution.

3. The method of claim 1, wherein the carboxylic acid groups are neutralized by basic substances selected from the group consisting of potassium bicarbonate, potassium hydroxide, sodium hydroxide and lithium hydroxide.

4. The method of claim 1, wherein the carboxylic acid salt groups comprise a cation selected from the group consisting of potassium ions, sodium ions and lithium ions.

5. The method of claim 1, wherein the neutralization of the carboxyl acid groups is performed by melt processing.

6. The method of claim 1, wherein the melt processing temperature of the thermoplastic copolymer with the carboxylic acid salt groups is greater than the melt processing temperature of the thermoplastic copolymer prior to being neutralized.

7. The method of claim 1, wherein the thermoplastic copolymer is polymerized from monomers comprising one or more acid-functional monomers comprising one or more (meth)acrylic acid monomers and from monomers comprising one or more non-acid-functional monomers comprising one or more ethylenically-unsaturated aromatic monomers.

8. The method of claim 1, wherein the thermoplastic copolymer further comprises one or more second acid-functional monomers having carboxyl acid groups and one or more second additional, non-acid monomers functional monomers.

9. The method of claim 1, wherein the thermoplastic copolymer further comprises one or more additives selected from the group consisting of impact modifiers, heat stabilizers, antioxidants, and combinations thereof.

10. The method of claim 1, wherein the thermoplastic copolymer has a glass transition temperature greater than about 160° C. and a melt processing temperature greater than about 250° C.

11. A method for printing a three-dimensional part with an extrusion-based additive manufacturing system, the method comprising:
   printing the three-dimensional part by extruding a part material in a plurality of layers comprising a plurality of roads, wherein the part material has a glass transition temperature greater than about 160° C., and
   printing a support structure by extruding a support material in a plurality of layers, wherein the support structure provides support for the three-dimensional part as the part is being printed, wherein the glass transition temperature of the support material is higher than about 150° C., the melt processing temperature is greater than about 220° C. and wherein the support material comprises a thermoplastic copolymer comprising carboxylic acid groups wherein a portion of the carboxylic acid groups are neutralized to form carboxylic acid salt groups, wherein a concentration of carboxylic acid salt groups is utilized to control the glass transition temperature of the support material.

12. The method of claim 11, further comprising disintegrating at least a portion of the support structure in an alkaline aqueous solution.

13. The method of claim 11, wherein the carboxylic acid groups are neutralized by basic substances selected from the group consisting of potassium bicarbonate, potassium hydroxide, sodium hydroxide and lithium hydroxide.

14. The method of claim 11, wherein the carboxylic acid salt groups comprise a cation selected from the group consisting of potassium ions, sodium ions and lithium ions.

15. The method of claim 11, wherein the thermoplastic copolymer is polymerized from monomers comprising one or more acid-functional monomers comprising one or more (meth)acrylic acid monomers and from monomers comprising one or more non-acid-functional monomers comprising one or more ethylenically-unsaturated aromatic monomers.

16. The method of claim 11, wherein the thermoplastic copolymer further comprises one or more second acid-functional monomers having carboxyl acid groups and one or more second additional, non-acid monomers functional monomers.

17. The method of claim 11, wherein the thermoplastic copolymer further comprises one or more additives selected from the group consisting of impact modifiers, heat stabilizers, antioxidants, and combinations thereof.

18. The method of claim 11, wherein the thermoplastic copolymer has a glass transition temperature greater than about 160° C. and a melt processing temperature greater than about 250° C.

* * * * *